United States Patent
Honjo et al.

(10) Patent No.: US 8,368,796 B2
(45) Date of Patent: Feb. 5, 2013

(54) CAMERA SYSTEM WITH SIDE BY SIDE IMAGE DISPLAY

(75) Inventors: Kenichi Honjo, Osaka (JP); Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/463,045

(22) Filed: May 3, 2012

(65) Prior Publication Data

US 2012/0212658 A1 Aug. 23, 2012

Related U.S. Application Data

(62) Division of application No. 12/128,667, filed on May 29, 2008, now Pat. No. 8,199,240.

(30) Foreign Application Priority Data

Jun. 1, 2007 (JP) .................................. 2007-146503

(51) Int. Cl.
*H04N 5/222* (2006.01)
*H04N 5/228* (2006.01)
*H04N 5/262* (2006.01)
*H04N 9/74* (2006.01)

(52) U.S. Cl. ................ 348/333.05; 348/222.1; 348/239; 348/588

(58) Field of Classification Search ............ 348/333.05, 348/239, 346, 588, 222.1
See application file for complete search history.

(56) References Cited

U.S. PATENT DOCUMENTS

| | | | |
|---|---|---|---|
| 5,172,234 A | 12/1992 | Arita et al. | |
| 5,486,893 A | 1/1996 | Takagi | |
| 5,557,358 A | 9/1996 | Mukai | |
| 6,285,436 B1 | 9/2001 | Tsuchihashi et al. | |
| 2001/0009453 A1 | 7/2001 | Tsuchihashi et al. | |
| 2003/0160874 A1 | 8/2003 | Kuroiwa | |
| 2006/0164441 A1 | 7/2006 | Wada et al. | |
| 2007/0153113 A1* | 7/2007 | Ueda et al. ............ | 348/335 |
| 2007/0273773 A1 | 11/2007 | Kuroiwa | |
| 2007/0291154 A1 | 12/2007 | Moon et al. | |

FOREIGN PATENT DOCUMENTS

| | | |
|---|---|---|
| EP | 1293927 A2 | 3/2003 |
| JP | 6006807 A | 1/1994 |
| JP | 10-173917 A | 6/1998 |
| JP | 2001-125173 | 5/2001 |
| JP | 2002-057937 A | 2/2002 |
| JP | 2003-066339 A | 3/2003 |
| JP | 2005-078032 A | 3/2005 |
| JP | 2006-166143 A | 6/2006 |

OTHER PUBLICATIONS

Office Action for JP 2007-146503 dated Sep. 6, 2011.

* cited by examiner

*Primary Examiner* — Chieh M Fan
*Assistant Examiner* — Quang Le
(74) *Attorney, Agent, or Firm* — Pearne & Gordon LLP

(57) ABSTRACT

A camera system has an imaging optical system, an imaging component, a liquid crystal monitor, an aperture setting component, and an image display controller. The liquid crystal monitor has a first display region and a second display region. The aperture setting component adjusts the aperture in a specific period so that the actual aperture value will be a preset value. The image display controller displays, in the first display region, a reference image acquired by the imaging component under conditions in which the aperture value is the preset value, and displays, in the second display region, a comparative image acquired by the imaging component at a different timing from that of the reference image.

4 Claims, 18 Drawing Sheets

CAMERA SYSTEM WITH SIDE BY SIDE IMAGE DISPLAY

CROSS-REFERENCE TO RELATED APPLICATIONS

This application is a divisional of U.S. patent application Ser. No. 12/128,667 filed May 29, 2008, which is incorporated herein by reference in its entirety. This application claims priority to Japanese Patent Application No. JP2007-146503 filed on Jun. 1, 2007. The entire disclosure of Japanese Patent Application No. JP2007-146503 is hereby incorporated herein by reference.

BACKGROUND OF THE INVENTION

1. Field of the Invention

The present invention relates to a camera system, and more particularly relates to a camera system with which a plurality of images can be displayed side by side.

2. Background Information

Single-lens reflex digital cameras have become tremendously popular in recent years. With a single-lens reflex digital camera, when an optical viewfinder is used to view a subject, the light incident on the imaging optical system is reflected by a reflecting minor disposed along the optical path, and is guided to the viewfinder optical system. As a result, the subject image is converted by a pentaprism or the like into an erect image before being guided to the viewfinder optical system. This allows the user to view the subject image formed by the imaging optical system through the optical viewfinder. Thus, the reflecting mirror is usually disposed along the optical path.

Meanwhile, when an optical image of the subject is converted into an image signal, the reflecting minor is retracted from the optical path so that the light from the imaging optical system will be incident on an imaging element. As a result, opto-electric conversion is performed by the imaging element, and image data about the subject is obtained. When imaging is complete, the reflecting mirror is returned to its home position along the optical path. With a single-lens reflex camera, this operation of the reflecting mirror is the same regardless of whether the camera is a conventional silver halide camera or a digital camera.

However, when the home position of the reflecting mirror lies in the optical path, the light from the imaging optical system is not incident on the imaging element. Therefore, in the case of a digital camera, with the above-mentioned system, a monitor photography mode, in which the user uses the liquid crystal monitor to view the subject, cannot be achieved, and a camera system such as this is inconvenient for a beginner unaccustomed to photography.

In view of this, as discussed in Japanese Laid-Open Patent Application 2001-125173, a single-lens reflex digital camera has been proposed with which a liquid crystal monitor can be used during image capture. With this camera system, in monitor photography mode, the reflecting mirror is retracted from the optical path and the light from the imaging optical system is incident on the imaging element. This allows the subject to be viewed on the liquid crystal monitor.

Also, the imaging element of a single-lens reflex digital camera is generally larger in size than the imaging element of an ordinary compact digital camera. Therefore, when an optical image of the subject is formed on the imaging element, a smaller area is in focus, and the subject field depth tends to be shallow. Therefore, with a single-lens reflex digital camera, it is important to adjust the aperture and confirm the subject field depth.

In view of this, as discussed in Japanese Laid-Open Patent Application H6-6807, a camera system has been proposed with which a plurality of images captured under different photography conditions, for example, can be displayed side by side.

However, if the user changes the framing, or if the subject moves, when the two images are compared, the composition can be quite different between the reference image acquired ahead of time and the comparative image serving as a live image, so that the images cannot be compared. Thus, a conventional camera system lacked convenience in comparing images in some situations.

SUMMARY OF THE INVENTION

The present invention provides a camera system which is designed and configured to improve convenience for the user by allowing a plurality of images to be displayed side by side.

According to an aspect of the present invention, the camera system includes an imaging optical system, an imaging component, a display component, a condition adjustment component, and a display control component. The imaging optical system forms an optical image of a subject. The imaging component converts the optical image into an image signal and successively acquires images of the subject. The display component has first and second display regions that allow a plurality of the images acquired by the imaging component to be displayed side by side. The condition adjustment component adjusts the photography condition to a first photography condition in a first period. The display control component controls the display component to display at least part of a first image acquired by the imaging component under the first photography condition as a reference image in the first display region, and displays at least part of a second image acquired by the imaging component at a different timing from that of the first image as a comparative image in the second display region.

With this camera system, optical images of the subject formed by the imaging optical system are converted into image signals by the imaging component, and images of the subject are successively acquired. The acquired images are displayed on the display component by the display control component. At this point, since the photography condition is adjusted to a first photography condition in a first period by the condition adjustment component, a reference image is displayed in the first display region in the first period. Meanwhile, a second image acquired under a photography condition that is the same as or different from the first photography condition is displayed in the second display region.

Here, when the plurality of images displayed in the first and second display regions are compared using the first image as a reference, the first image serving as the reference is successively updated to the most recent image acquired under a specific photography condition. As a result, when the user changes the frame, or when the subject moves, for example, two successively updated images with substantially the same composition can be compared. That is, this camera system is more convenient in comparing images.

The first period referred to here means the time interval during which the same operation (one or more operations) is repeated for a specific length of time. Examples of photography conditions include the aperture value, the shutter speed, and the photography mode (such as nighttime mode).

According to another aspect of the present invention, the camera system further includes a condition input component with which the photography condition can be inputted. The condition adjustment component adjusts the photography condition to a second photography condition inputted to the condition input component, at a different timing from the timing at which the photography condition is adjusted to the first photography condition.

According to yet another aspect of the present invention, the condition adjustment component of the camera system adjusts the photography condition to the first photography condition in the first period, and adjusts the photography condition to the second photography condition in a second period.

According to still another aspect of the present invention, the first period is the same as the second period.

According to a further aspect of the present invention, the display control component of the camera system continues to display the most recent reference image on the display component until a newer reference image is acquired, and continues to display the most recent comparative image on the display component until a newer comparative image is acquired.

According to yet a further aspect of the present invention, the display control component of the camera system enlarges the reference image in the first display region more than the other portion of the first image. The display control component enlarges the comparative image in the second display region more than the other portion of the second image.

According to still a further aspect of the present invention, the reference image and the comparative image of the camera system are in a relationship of linear symmetry based on the center lines of the images acquired by the imaging component.

These and other features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Embodiments of the present invention will now be described through reference to the drawings.

1: Overall Configuration of Camera System

Figure 1:
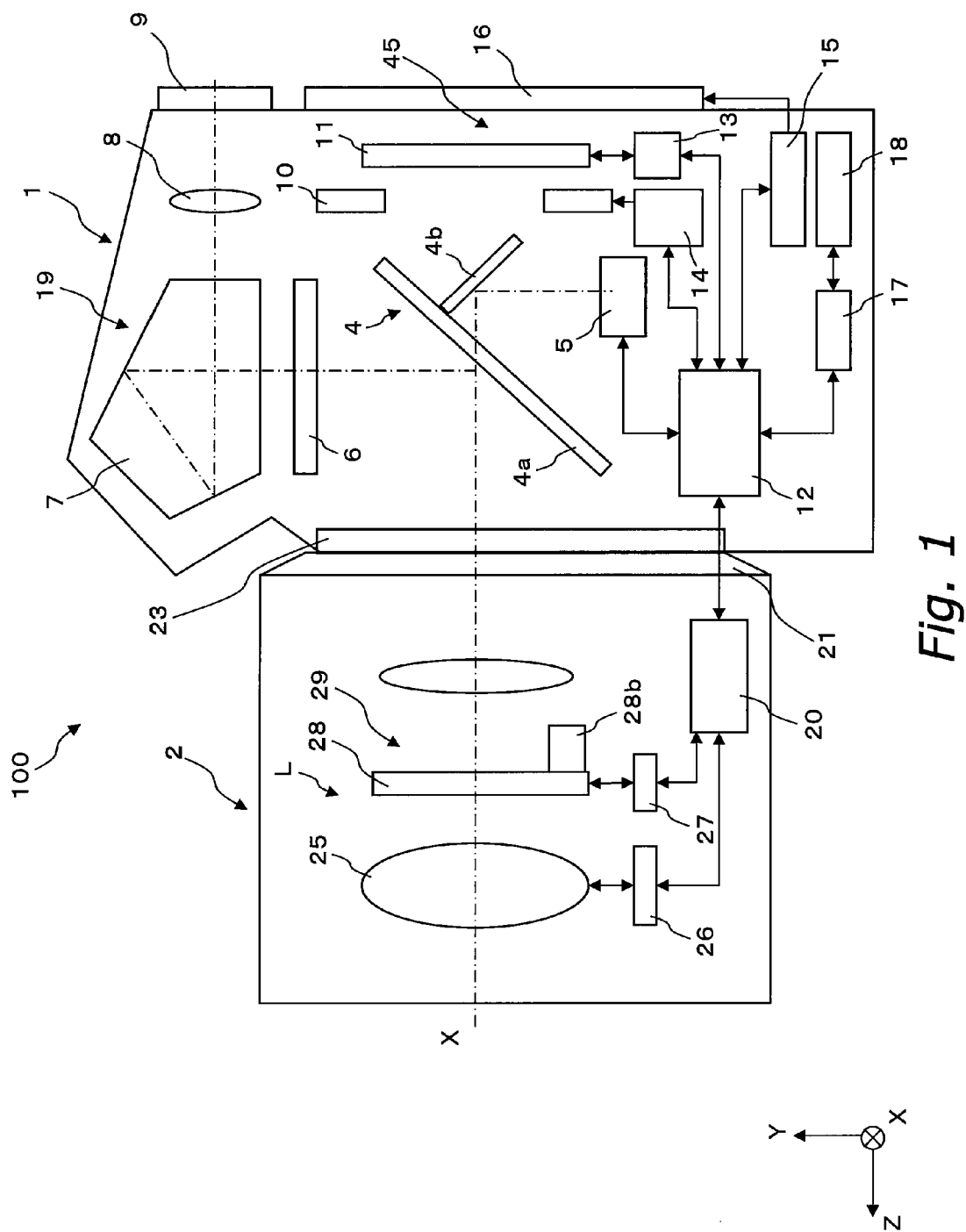
FIG. 1 is a block diagram of a control system for an interchangeable lens unit and digital camera main body pertaining to a first embodiment of the present invention.

The camera system 100 pertaining to the first embodiment of the present invention will be described. FIG. 1 is a diagram of the overall configuration of the camera system 100 pertaining to the first embodiment of the present invention.

The camera system 100 shown in FIG. 1 is an interchangeable lens type of single-lens reflex digital camera system. The camera system 100 includes a camera main body 1 and an interchangeable lens unit 2.

The camera system 100 and the interchangeable lens unit 2 exchange various control signals via an electrical contact (not shown) of a lens mount 21 on the interchangeable lens unit 2 side and an electrical contact (not shown) of a body mount 23 on the camera system 100 side.

1.1: Configuration of Interchangeable Lens Unit

The interchangeable lens unit 2 mainly includes an imaging optical system L, an aperture setting component 29 serving as a condition adjustment component for adjusting the aperture of the imaging optical system L, and a lens microprocessor 20 for controlling various sequences of the interchangeable lens unit 2. The interchangeable lens unit 2 has the lens mount 21 and is removably mounted to the body mount 23 provided to the body front face of the camera main body 1.

The interchangeable lens unit 2 has the imaging optical system L for forming an optical image of a subject. Also, the lens microprocessor 20 is mounted to control the various sequences of the interchangeable lens unit 2 and to hold various kinds of lens information. A focus controller 26 is mounted inside the interchangeable lens unit 2 for controlling the drive of a focus lens group 25. An aperture controller 27 for controlling an aperture unit 28 is also mounted.

The imaging optical system L mainly includes the focus lens group 25 and the aperture unit 28.

The aperture setting component 29 mainly includes an aperture ring 40 serving as a condition input component which the user can turn to input aperture values, an aperture linear sensor 41 for outputting a physical quantity according to the rotational angle of the aperture ring 40, a diaphragm drive motor 28b for driving diaphragm blades, and the aperture controller 27 for adjusting the aperture to be equal to the set aperture value.

The lens microprocessor 20 is a control device serving as the functional center of the interchangeable lens unit 2 and is connected to various components mounted in the interchangeable lens unit 2. The lens microprocessor 20 also controls various sequences of the interchangeable lens unit 2. For example, a CPU and a memory 69 are installed in the lens microprocessor 20, and various functions can be realized by having the CPU read programs stored in the memory 69. The lens microprocessor 20 outputs commands (such as control signals) to the focus controller 26, the aperture controller 27, a shift controller 47, and so forth, and thereby executes control over the focus controller 26, the aperture controller 27, the shift controller 47, and so forth. Also, the lens microprocessor 20 is connected via an interface with a body microprocessor 12, and communicates with this body microprocessor 12.

1.2: Configuration of Camera Main Body

The camera main body 1 generally includes a quick return mirror 4, a focus detection unit 5, a viewfinder optical system 19, a shutter unit 10, an imaging component 45, an image display component 46, a photography mode switching component 48, a depth of field reviewing mode setting component 49, a shutter controller 14, an image recorder 18, and the body microprocessor 12. The quick return mirror 4 varies the path taken by light from the subject. The viewfinder optical system 19 is used for viewing a subject image. The focus detection unit 5 is used for performing focus detection. The shutter unit 10 opens and closes the shutter. The imaging component 45 is used for acquiring a subject image as a photographic image. The image display component is for displaying a photographic image. The photography mode switching component is used for switching between photography modes. The depth of field review setting component is for setting to depth of field reviewing mode. The shutter controller 14 controls the shutter unit 10, and the image recorder 18 records a photographic image. The body microprocessor 12 is used for controlling various sequences of the camera main body 1.

The viewfinder optical system 19 constitutes an observation optical system, the quick return mirror 4 constitutes a movable mirror, a photography mode switching button 75 and the body microprocessor 12 constitute the photography mode switching component 48, and a depth of field reviewing button 76 and the body microprocessor 12 constitute the depth of field reviewing mode setting component 49.

Subject light that has passed through the interchangeable lens unit 2 is split into two beams (reflected light beam and transmitted light beam) by a main mirror 4a of the quick return mirror 4, and the reflected beam is guided to the viewfinder optical system 19. The transmitted beam, meanwhile, is reflected by a sub-mirror 4b provided on the rear face side of the quick return mirror 4 and is utilized as an AF light beam for the focus detection unit 5. The focus detection unit 5 generally makes use of a phase difference detection method.

The light beam reflected by the main mirror 4a forms an image on a viewfinder screen 6. The subject image formed on the viewfinder screen 6 can be observed through a viewfinder eyepiece window 9 via a pentaprism 7 and an eyepiece 8.

The body microprocessor 12 that controls various sequences is installed in the camera system 100. An imaging sensor controller 13 controls the drive of an imaging sensor 11. The shutter controller 14 controls the drive of the shutter unit 10. An image display controller 15 reads image data from the imaging sensor 11 and performs specific image processing, after which the photographic image is displayed on a liquid crystal monitor 16. An image recording controller 17 reads and writes photographic images through the image recorder 18 from and to a recording medium such as an SD card (not shown).

The quick return mirror 4 mainly includes the main mirror 4a and a sub-mirror 4b. The main mirror 4a is capable of reflecting and transmitting incident light. The sub-mirror 4b is provided on the rear face side of the main mirror 4a and reflects transmitted light from the main mirror 4a. The quick return mirror 4 can also be flipped up outside the optical path X by a quick return mirror controller 60. This quick return mirror 4 is disposed so as to be movable between the position shown in FIG. 2 and the position shown in FIG. 3. Also, incident light is split into two beams by the main mirror 4a, the reflected beam is guided to the viewfinder optical system 19, while the transmitted beam is reflected by the sub-mirror 4b and guided to the focus detection unit 5.

The viewfinder optical system 19 generally includes the viewfinder screen 6 where an image of the subject is formed, the pentaprism 7 for converting the subject image into an erect image, the eyepiece 8 for guiding the erect image of the subject to the viewfinder eyepiece window 9, and the viewfinder window 9 through which the user can see the subject.

The focus detection unit 5 is a unit for detecting whether or not an image formed by light from the subject is in a focused state (detecting focus) from the light reflected by the sub-mirror 4b. The focus detection unit 5 performs focus detection, for example, by a standard phase difference detection method.

The imaging component 45 mainly includes the imaging sensor 11 (such as a CCD) for performing opto-electric conversion and the imaging sensor controller 13 for controlling the imaging sensor 11. The imaging component 45 is arranged to acquire the subject image as a photographic image. The imaging component 45 converts the subject image produced by incident light into an electrical signal for forming a photographic image.

The image display component 46 includes the liquid crystal monitor 16 and the image display controller 15 that controls the operation of the liquid crystal monitor 16. The image recorder 18 records and reproduces photographic images to and from a card-type recording medium (not shown), for example. The image recorder 18 is controlled by the image recording controller 17, which controls the operation of the image recorder 18. The liquid crystal monitor 16 has two display regions, for example, so that a plurality of images can be displayed side by side. The image display controller 15 is able to display different images separately in two display regions of the liquid crystal monitor 16.

The body microprocessor 12 is a control device serving as the functional center of the camera main body 1, and controls various sequences. The body microprocessor 12 is equipped with a CPU, ROM, and RAM, for example, and the body microprocessor 12 can perform many different functions when programs held in the ROM are read by the CPU. The body microprocessor 12 outputs commands (such as control signals) to the shutter controller 14, the imaging sensor controller 13, the image display controller 15, the image recording controller 17, etc., and thereby executes control over the shutter controller 14, the imaging sensor controller 13, the image display controller 15, the image recording controller 17, etc. Also, the body microprocessor 12 is connected via an interface with the lens microprocessor 20, and communicates with this lens microprocessor 20.

As will be discussed herein below, the body microprocessor 12 further has the function of sending a control signal to the aperture controller 27 in a specific period (first period) so that the aperture value of the aperture setting component 29 will be a preset value. In addition, the body microprocessor 12 has the function of sending a control signal to the aperture controller 27 in a specific period (second period) so that the aperture value of the aperture setting component 29 will be the indicated value of the aperture ring 40. Also, the body microprocessor 12 has the function of sending a control signal to the imaging component 45 to acquire an image, the function of displaying the acquired image on the image display controller 15, and so forth.

1.3: Viewfinder Photography Mode and Monitor Photography Mode

This camera system 100 has a viewfinder photography mode and monitor photography mode as its photography modes. The viewfinder photography mode is a mode in which the user looks through the viewfinder eyepiece window 9 to see the subject and is the ordinary photography mode for a conventional single-lens reflex camera.

Figure 2:
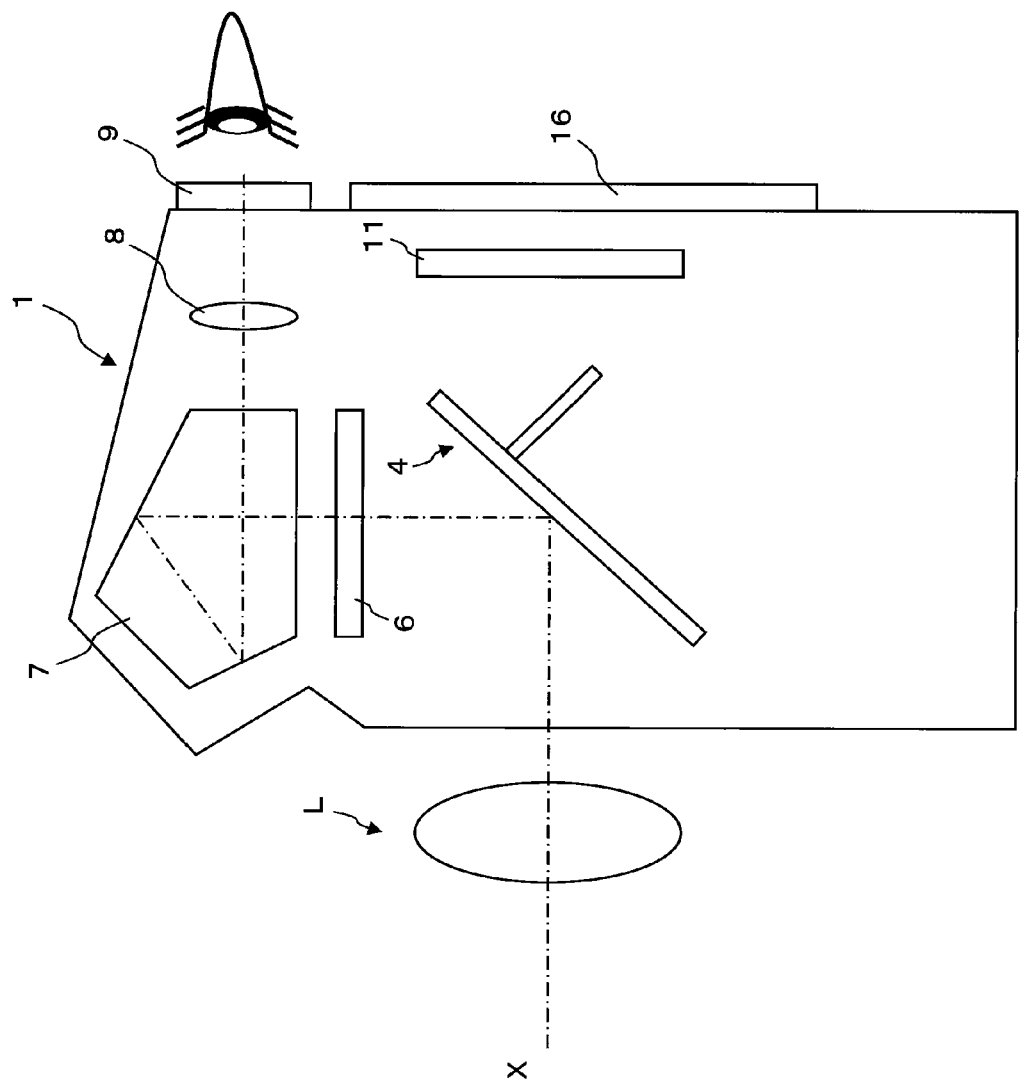
FIG. 2 is a concept diagram illustrating a viewfinder photography mode pertaining to the first embodiment of the present invention.

In this viewfinder photography mode, as shown in FIG. 2, the quick return mirror 4 is disposed in a specific position in optical path X, and subject light is guided to the viewfinder optical system 19, so the user can see the subject image through the viewfinder eyepiece window 9. During actual photography, the quick return mirror 4 flips up outside the optical path X, and the shutter unit 10 is opened so that the subject image is formed on the imaging face of the imaging sensor 11.

Figure 3:
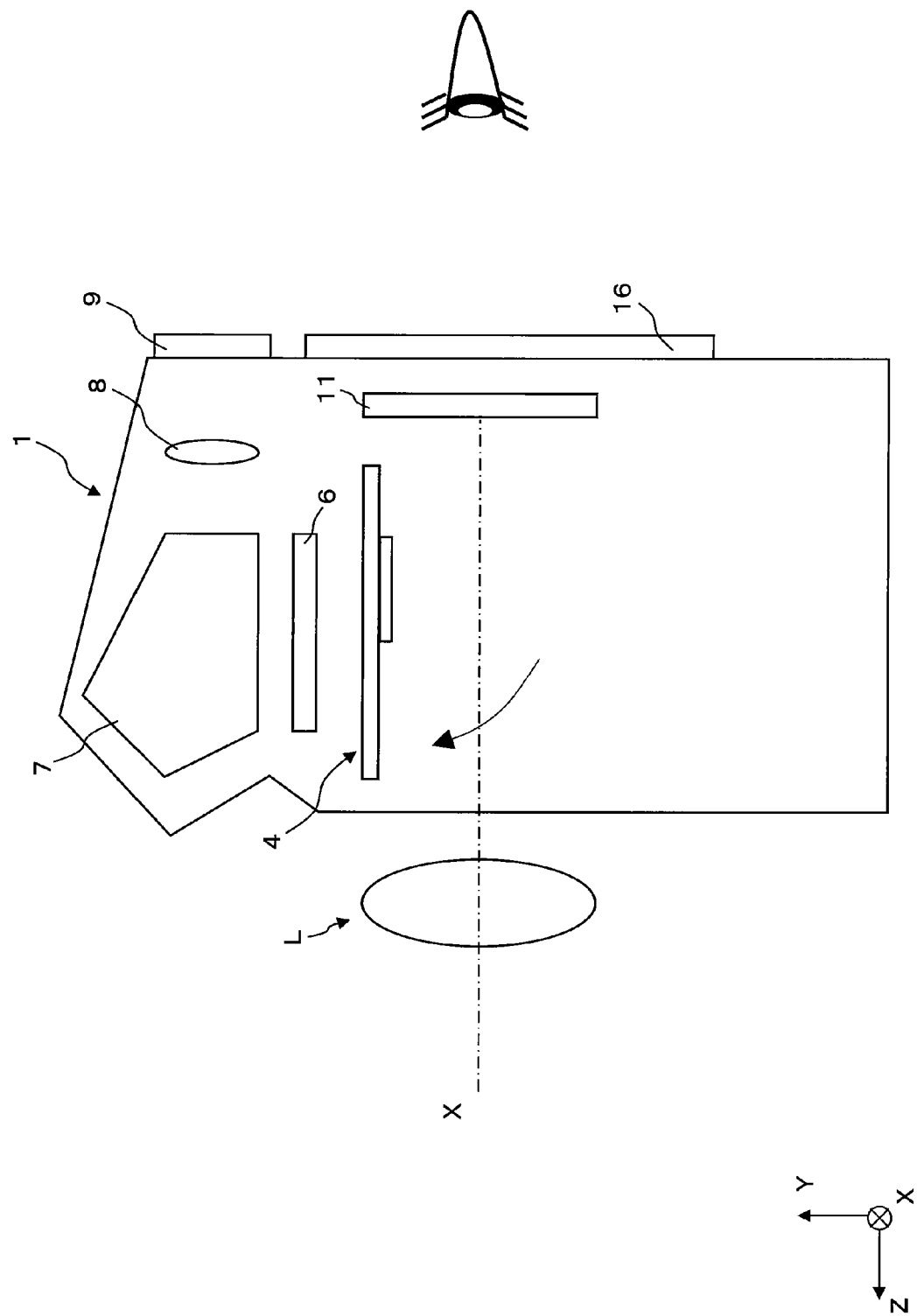
FIG. 3 is a concept diagram illustrating a monitor photography mode pertaining to the first embodiment of the present invention.

The monitor photography mode is a mode in which the user takes a photo while looking at the subject displayed on the liquid crystal monitor 16. In the monitor photography mode, as shown in FIG. 3, the quick return mirror 4 is retracted from the optical path X. The subject image, or what is known as a through-image, is displayed on the liquid crystal monitor 16 via the imaging sensor 11.

1.4: Configuration of Interchangeable Lens Unit

Figure 4:
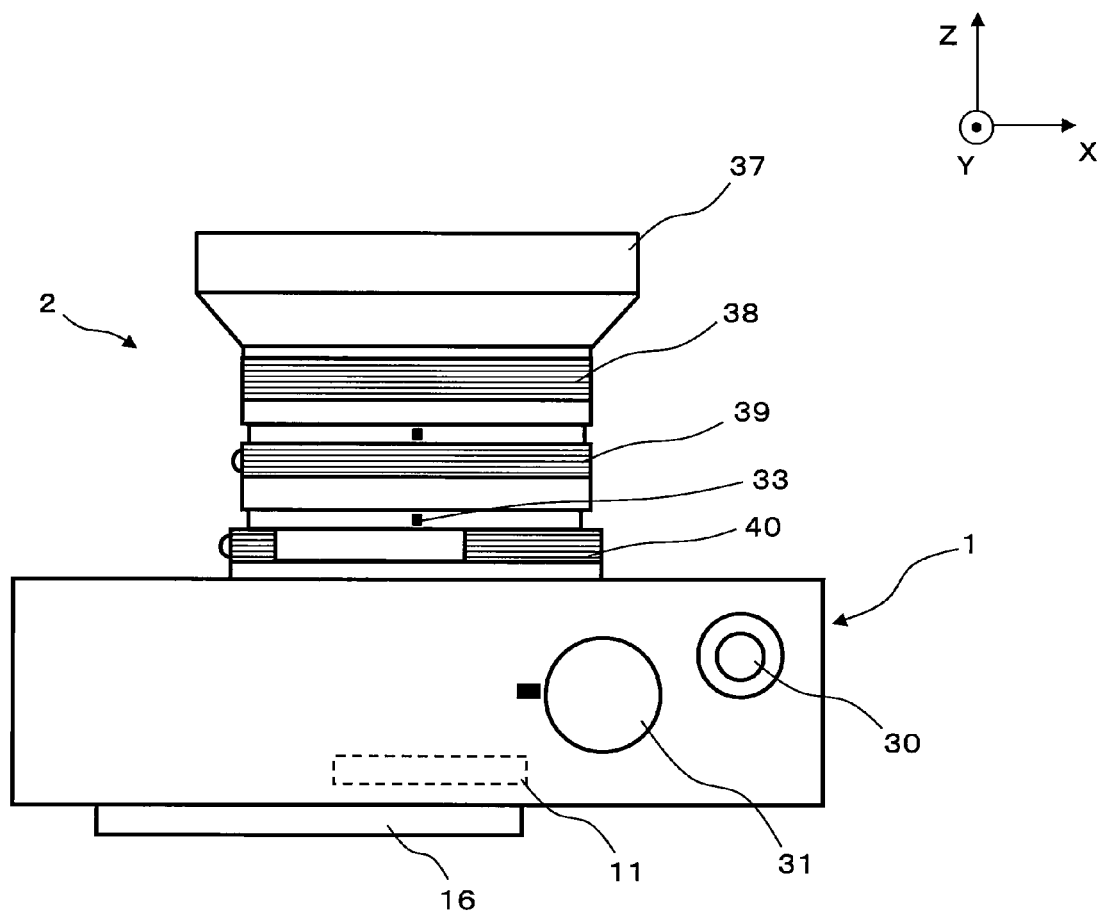
FIG. 4 is a top view of a digital camera pertaining to the first embodiment of the present invention.

FIG. 4 is a top view of the camera system 100 to which has been attached the interchangeable lens unit 2 as in the first embodiment of the present invention. The X, Y, and Z axes are defined as shown in FIG. 4 (assuming the Z axis to be parallel to the optical axis of the lenses constituting the imaging optical system L).

The camera system 100 has a housing that is held by the user when the subject is being photographed. This camera system 100 includes a release button 30 and a shutter speed setting component 31. The release button 30 and shutter speed setting component 31 are provided on the right side of the upper face of the camera main body 1.

The shutter speed setting component 31 is a control member that is turned to set the shutter speed. Also, the shutter speed setting component 31 has an auto position in which the shutter speed is set automatically.

The main body of the camera system 100 includes the liquid crystal monitor 16. The liquid crystal monitor 16 is provided on the side of the camera system 100 main body that faces the user. The operation of the liquid crystal monitor 16 will be described below.

The interchangeable lens unit 2 has a filter mount 37 on the side closest to the subject (the positive side in the Z axial direction). The interchangeable lens unit 2 has a zoom ring 38, a focus ring 39, and the aperture ring 40, in that order from the filter mount 37 toward the camera system 100 main body side (the negative direction of the Z axis). The zoom ring 38, focus ring 39, and aperture ring 40 are all cylindrical rotating control members, and are rotatably disposed around the outer peripheral face of the interchangeable lens unit 2.

1.5: Configuration of Rear Face of Camera Main Body

Figure 5:
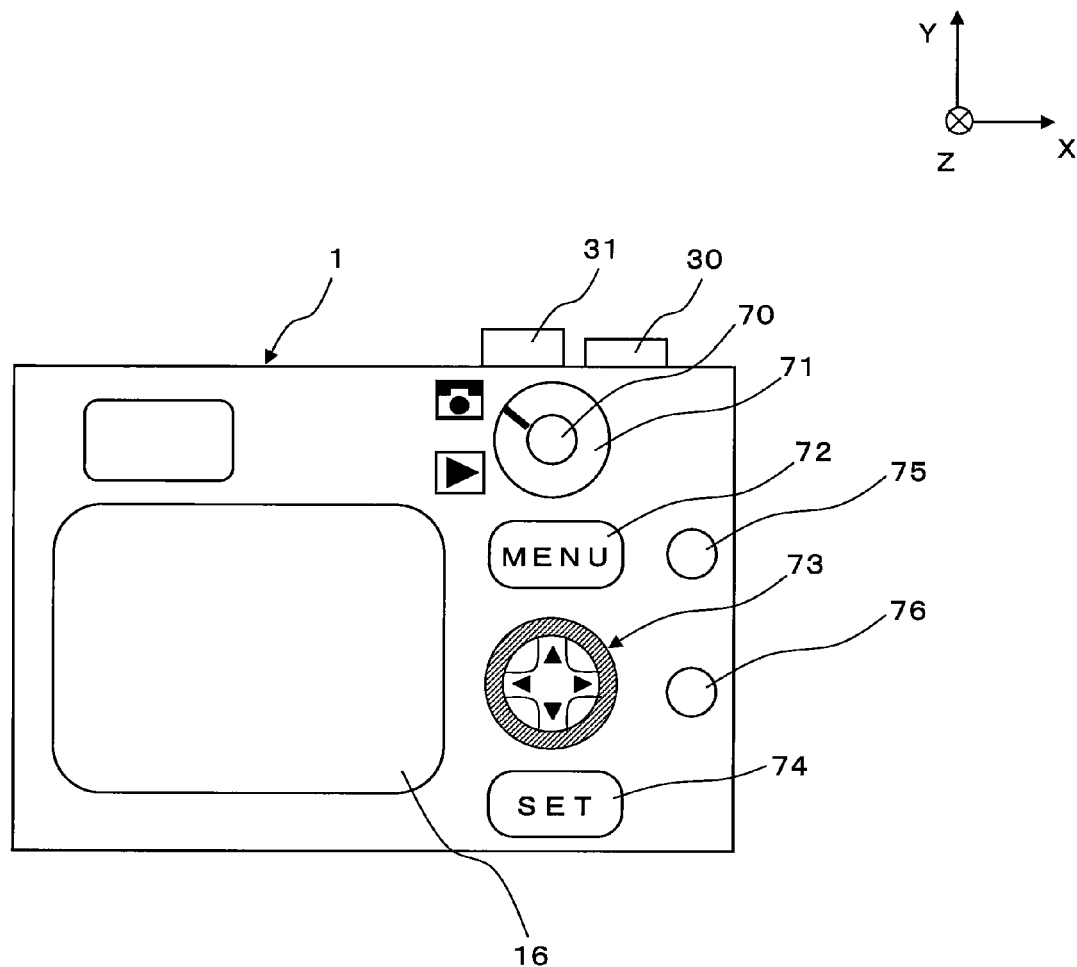
FIG. 5 is a rear view of the digital camera pertaining to the first embodiment of the present invention.

FIG. 5 is a rear view of the camera system 100 pertaining to the first embodiment of the present invention. The camera system 100 main body includes a power button 70, a photography/reproduction mode switching lever 71, a menu button 72, a directional arrow key 73, a set button 74, and a depth of field reviewing button 76.

The power button 70 is a control member that is operated to turn the power on and off to the camera system 100. The photography/reproduction mode switching lever 71 is a control member that is operated to switch between a photography mode and a reproduction mode by switching a lever. The photography mode referred to here is a mode that is set to capture a new subject image and create an image signal with the camera system 100. The reproduction mode is a mode that is set to display an image signal already captured and stored in the camera system 100.

The menu button 72 is a control member that is operated to display various operation menus on the liquid crystal monitor 16. The directional arrow key 73 has up, down, left, and right arrow keys, and is a control member that is operated to select displayed categories from various operation menus. The set button 74 is a control member that is operated to set the display categories on various operation menus.

The depth of field reviewing button 76 is a button for changing to a depth of field reviewing mode, which is discussed below. With the camera system 100, the user presses this depth of field reviewing button 76 to change to depth of field reviewing mode.

1.6: Aperture

Figure 6A:
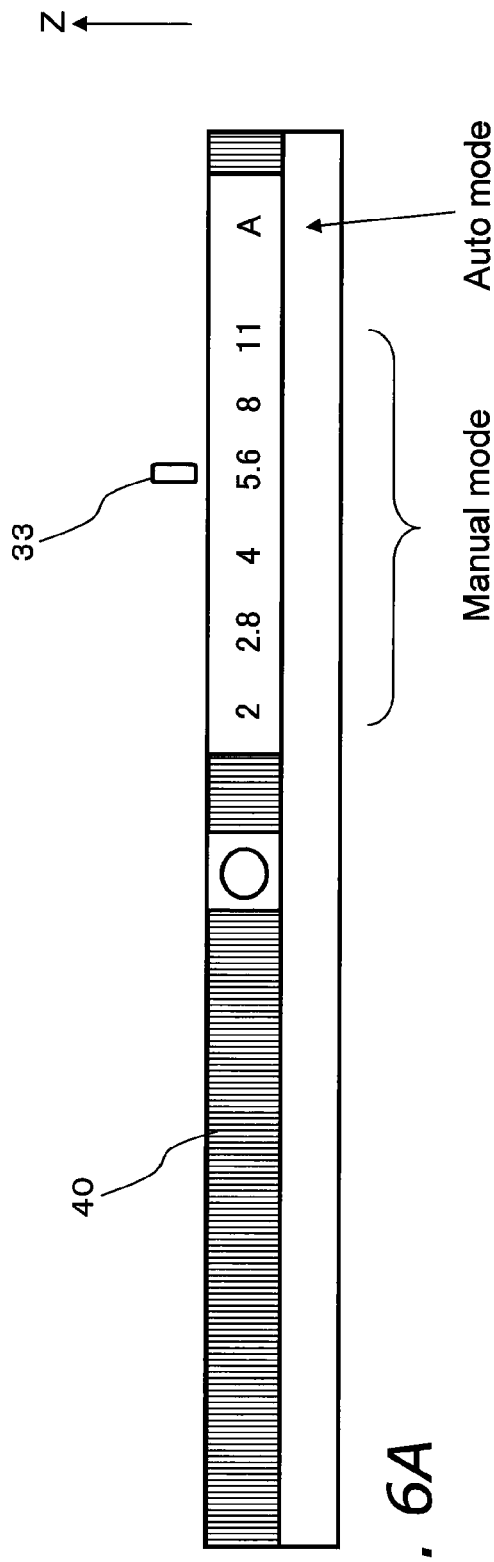
FIG. 6A is a development diagram of the outer peripheral face of an aperture ring pertaining to the first embodiment of the present invention.
Figure 6B:
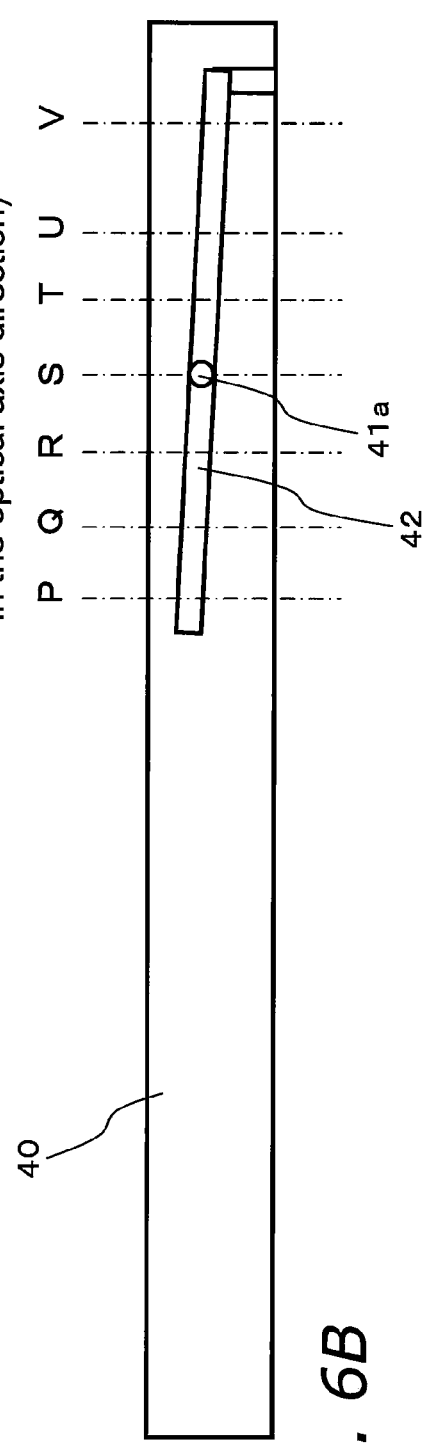
FIG. 6B is a development diagram of the inner peripheral face of the aperture ring pertaining to the first embodiment of the present invention.

The aperture ring 40 is cylindrical in shape. FIG. 6A is a development diagram of the outer peripheral face of the aperture ring pertaining to the first embodiment of the present invention, and FIG. 6B is a development diagram of the inner peripheral face of the aperture ring pertaining to the first embodiment of the present invention.

As shown in FIGS. 4 and 6A, aperture values are displayed on the outer peripheral face of the aperture ring 40. The display region of the aperture values is divided into two regions. In FIG. 6A, each display portion of 1 AV (aperture value) from "2" to "11" corresponds to the aperture value of the manual region. Also, in FIG. 6A, the display portion "A" corresponds to the aperture value of the auto region. As shown in FIGS. 4 and 6B, the aperture ring 40 has a straight cam groove 42 on its inner peripheral face. The aperture value need not only be selected in 1 AV increments.

The interchangeable lens unit 2 has the aperture unit 28 in its interior. The aperture unit 28 includes in its interior diaphragm drive motor 28b for driving aperture blades (not shown). The diaphragm drive motor 28b drives the aperture blades in accordance with the rotational angle of the aperture ring 40 by control which will be described later. The aperture value of the imaging optical system L is changed by driving these aperture blades.

Figure 7:
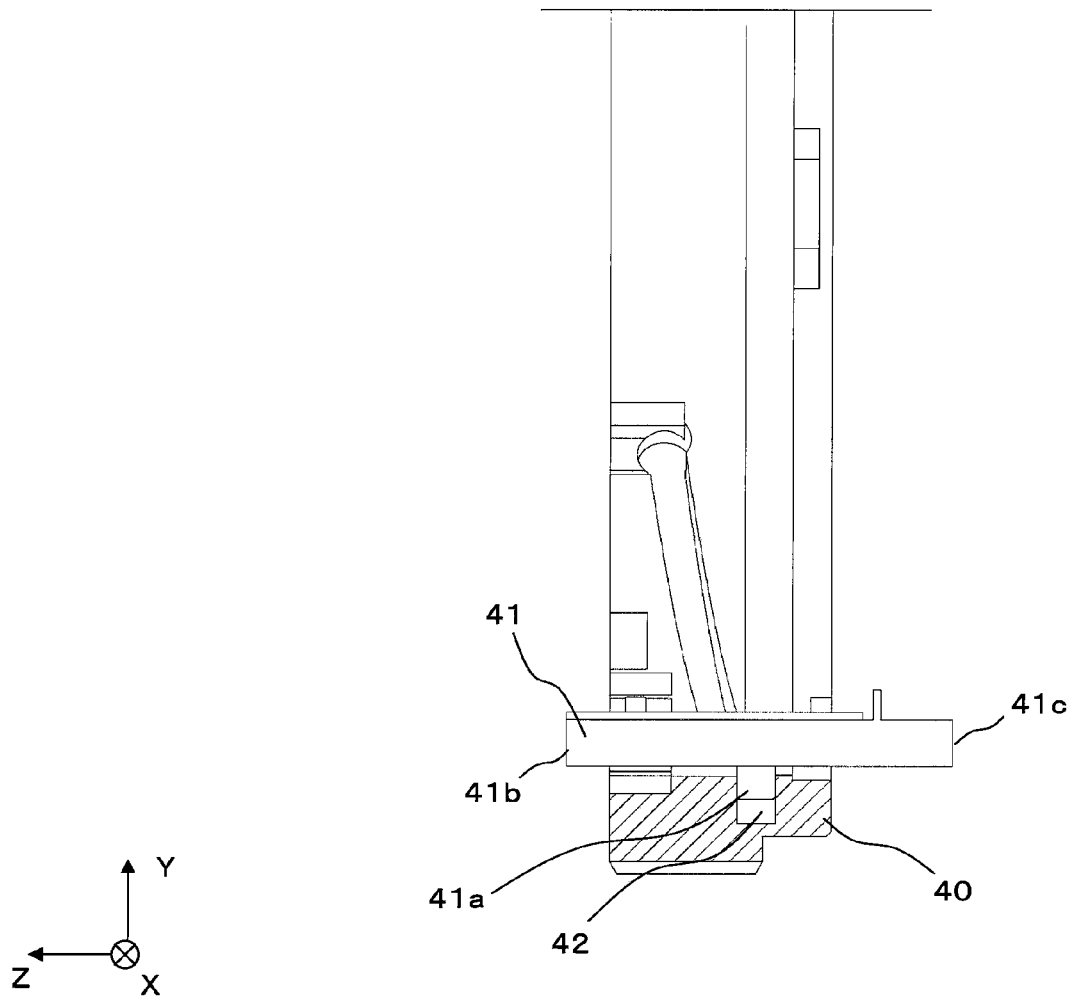
FIG. 7 is a partial cross section showing the linkage of an aperture linear sensor and the aperture ring pertaining to the first embodiment of the present invention.

FIG. 7 is a partial cross section showing the linkage of the aperture linear sensor 41 and the aperture ring 40 pertaining to the first embodiment of the present invention. The aperture linear sensor 41 includes a slider 41a that has a cylindrical shape that protrudes to the outside of the aperture ring 40 in the radial direction. The cam groove 42 formed in the aperture ring 40 links with the slider 41a of the aperture linear sensor 41.

Figure 8B:
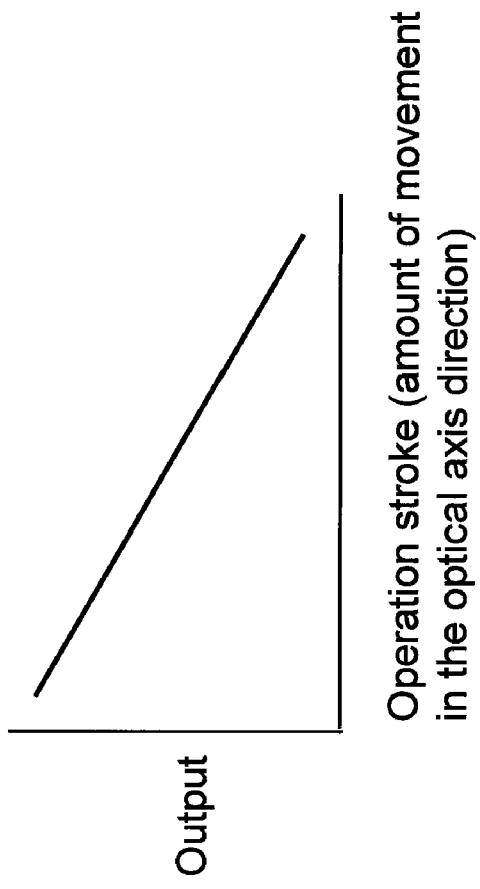
FIG. 8B is a graph of the output of the aperture linear sensor of the lens barrel in the first embodiment of the present invention.
Figure 8A:
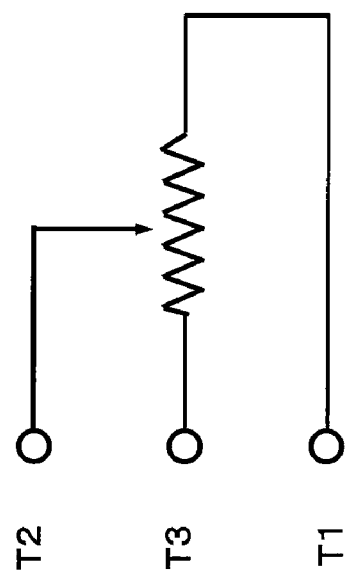
FIG. 8A is a circuit diagram of the aperture linear sensor of a lens barrel in the first embodiment of the present invention.

This aperture linear sensor 41 is mainly constituted by a circuit having a varistor as shown in FIG. 8A. The terminal T2 in FIG. 8A is connected to the slider 41a in FIG. 7, while the terminals T2 and T3 are connected to the two ends 41b and 41c of the aperture linear sensor in FIG. 7. When a specific voltage is applied between the terminals T1 and T3, the cylindrical slider 41a provided to the aperture linear sensor 41 slides over a magnetic resistor (not shown) inside the aperture linear sensor 41, causing the output of the terminal T2 (output voltage) to vary linearly as shown in FIG. 8B.

Figure 9:
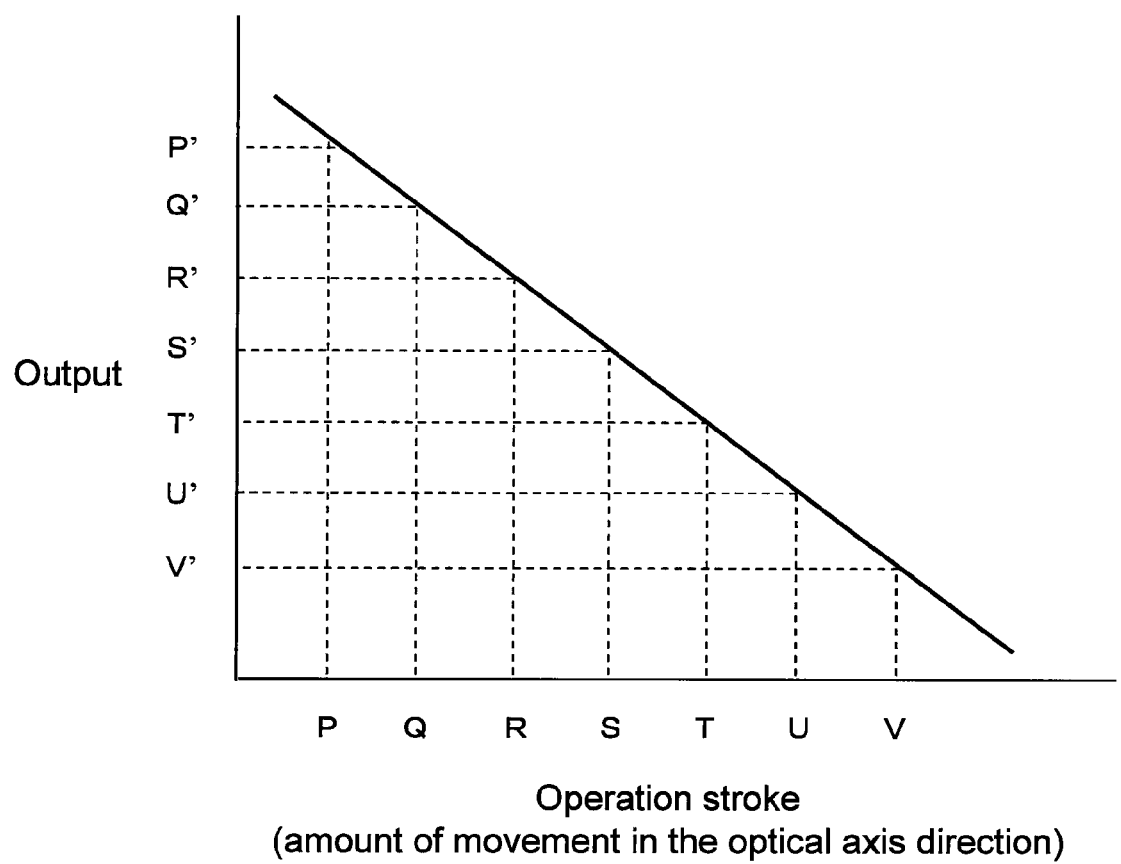
FIG. 9 is a graph of the relationship between the output value of the aperture linear sensor and the rotational angle of the aperture ring pertaining to the first embodiment of the present invention.

FIG. 9 is a graph of the relationship between the output value of the aperture linear sensor 41 (output voltage value) and the rotational angle of the aperture ring 40 pertaining to the first embodiment of the present invention. In FIGS. 4 and 6, when the aperture ring 40 is turned until the position where the number "2" is displayed on the aperture ring 40 matches up with the position of a pointer 33, the slider 41a of the aperture linear sensor 41 is in the position P on the cam groove 42. In this case, the output value of the aperture linear sensor 41 (output voltage value) is P'. That is, P' is the output voltage value of the aperture linear sensor 41 corresponding to the rotational angle of the aperture ring 40 when the position where the number "2" is displayed on the aperture ring 40 matches up with the position of the pointer 33.

Similarly, when the aperture ring 40 is turned until the positions where the numbers "2," "2.8," "4," "5.6," "8," "11," and "A" are displayed on the aperture ring 40 match up with the position of the pointer 33, the slider 41a of the aperture linear sensor 41 is in the positions P, Q, R, S, T, U, and V, respectively, on the cam groove 42. In this case, the output values of the aperture linear sensor 41 (output voltage values) are P', Q', R', S', T', U', and V', respectively. That is, P', Q', R', S', T', U', and V' are the output voltage values of the aperture linear sensor 41 corresponding to the rotational angle of the aperture ring 40 when the positions where the numbers "2," "2.8," "4," "5.6," "8," "11," and "A," respectively, displayed on the aperture ring 40 match up with the position of the pointer 33.

Thus, the aperture linear sensor 41 indicates the output (output voltage value) that corresponds in a one-to-one ratio to the rotational angle of the aperture ring 40. Therefore, the rotational angle of the aperture ring 40 can be detected by the aperture linear sensor 41. The aperture linear sensor 41 outputs as a voltage change an aperture value signal corresponding to a rotational angle.

1.7: Control System for Camera Main Body

Figure 10:
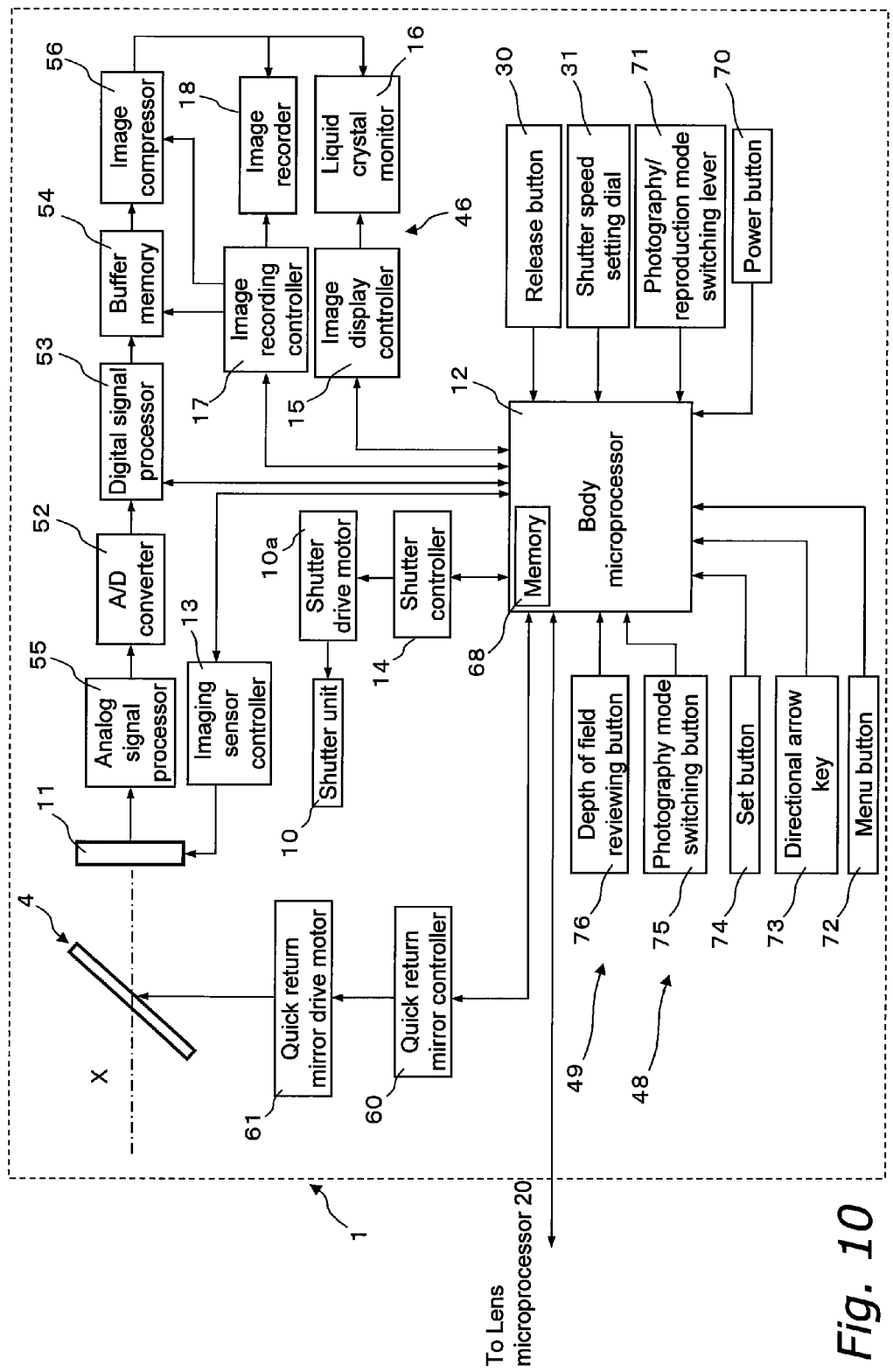
FIG. 10 is a block diagram of the control system inside the digital camera pertaining to the first embodiment of the present invention.

FIG. 10 is a block diagram of the control system of the camera system 100 pertaining to the first embodiment of the present invention.

The body microprocessor 12 can receive signals from the release button 30, the shutter speed setting component 31, the photography/reproduction mode switching lever 71, the menu button 72, the directional arrow key 73, the set button 74, a photography mode switching button 75, and the depth of field reviewing button 76. Also, the body microprocessor 12 can send signals to the shutter controller 14 and the quick return mirror controller 60. Furthermore, the body microprocessor 12 can perform bidirectional communication between the body microprocessor 12 and the image recording controller 17, bidirectional communication between the body microprocessor 12 and the image display controller 15, and bidirectional communication between the body microprocessor 12 and a digital signal processor 53. The body microprocessor 12 also has a memory 68 for storing signals.

The shutter controller 14 drives a shutter drive motor 10a on the basis of a control signal from the body microprocessor 12. The quick return mirror controller 60 drives a quick return mirror drive motor 61 on the basis of a control signal from the body microprocessor 12.

The release button 30 sends information indicating shutter timing to the body microprocessor 12. The shutter speed setting component 31 sends set shutter speed information and shutter motor information.

The imaging sensor 11 is constituted by a CCD (charge coupled device) or the like. The imaging sensor 11 converts an optical image formed by the imaging optical system L of the interchangeable lens unit 2 into an electrical image signal. The drive of the imaging sensor 11 is controlled by the imaging sensor controller 13. The image signal outputted from the imaging sensor 11 is processed by an analog signal processor 55, an A/D converter 52, a digital signal processor 53, a buffer memory 54, and an image compressor 56, in that order.

An image signal is sent from the imaging sensor 11 to the analog signal processor 55. The analog signal processor 55 subjects the image signal outputted by the imaging sensor 11 to analog signal processing, such as gamma processing. The image signal outputted from the analog signal processor 55 is sent to the A/D converter 52. The A/D converter 52 converts the analog image signal outputted from the analog signal processor 55 into a digital signal.

The image signal outputted from the A/D converter 52 is sent to the digital signal processor 53. The digital signal processor 53 subjects the image signal converted into a digital signal by the A/D converter 52 to digital signal processing, e.g. noise elimination or contour enhancement. The image signal outputted from the digital signal processor 53 is sent to the buffer memory 54. The buffer memory 54 temporarily stores the image signal processed by the digital signal processor 53. The buffer memory 54 consists of a RAM (random access memory) or the like.

The image signal outputted from the buffer memory 54 is sent to the image compressor 56 according to a command from the image recording controller 17. The image compressor 56 subjects the image signal to compression processing according to a command from the image recording controller 17. The image signal is compressed to a data size that is smaller than that of the original data. The compression method can be, for example, JPEG (Joint Photographic Experts Group).

The compressed image signal is sent from the image compressor 56 to the image recorder 18 and the liquid crystal monitor 16. Meanwhile, the body microprocessor 12 sends a control signal to the image recording controller 17 and the image display controller 15. The image recording controller 17 controls the image recorder 18 on the basis of a control signal from the body microprocessor 12. The image display controller 15 controls the liquid crystal monitor 16 on the basis of a control signal from the body microprocessor 12.

The image recorder 18 records the image signal to an internal memory and/or removable memory on the basis of a command from the image recording controller 17. The image recorder 18 records information to be stored along with the image signal to an internal memory and/or removable memory on the basis of a command from the image recording controller 17. The information to be stored along with the image signal includes the date and time the image was captured, focal distance information, shutter speed information, aperture value information, and photography mode information.

The liquid crystal monitor 16 displays the image signal as a visible image on the basis of a command from the image display controller 15. The liquid crystal monitor 16 displays information to be displayed along with the image signal on the basis of a command from the image display controller 15. The information to be displayed along with the image signal includes focal distance information, shutter speed information, aperture value information, photography mode information, and focus state information.

Also, the liquid crystal monitor 16 displays a setting screen to be set by the user, etc., in a specific photography/reproduction mode on the basis of a command from the image display controller 15.

When the user, etc., captures an image, the power button 70 is switched on and the photography/reproduction mode switching lever 71 is put in the photography mode. This turns on the power to the camera system 100 main body, and an optical image of the subject which has been converted into an electrical image signal by the imaging sensor 11 is displayed as a visible image on the basis of a command from the image display controller 15.

When the camera system 100 is in its photography mode and the user presses the menu button 72, the liquid crystal monitor 16 displays the setting categories that can be changed by the user in photography mode as an iconized setting menu screen on the basis of a command from the image display controller 15.

1.8: Interchangeable Lens Unit Control System

Figure 11:
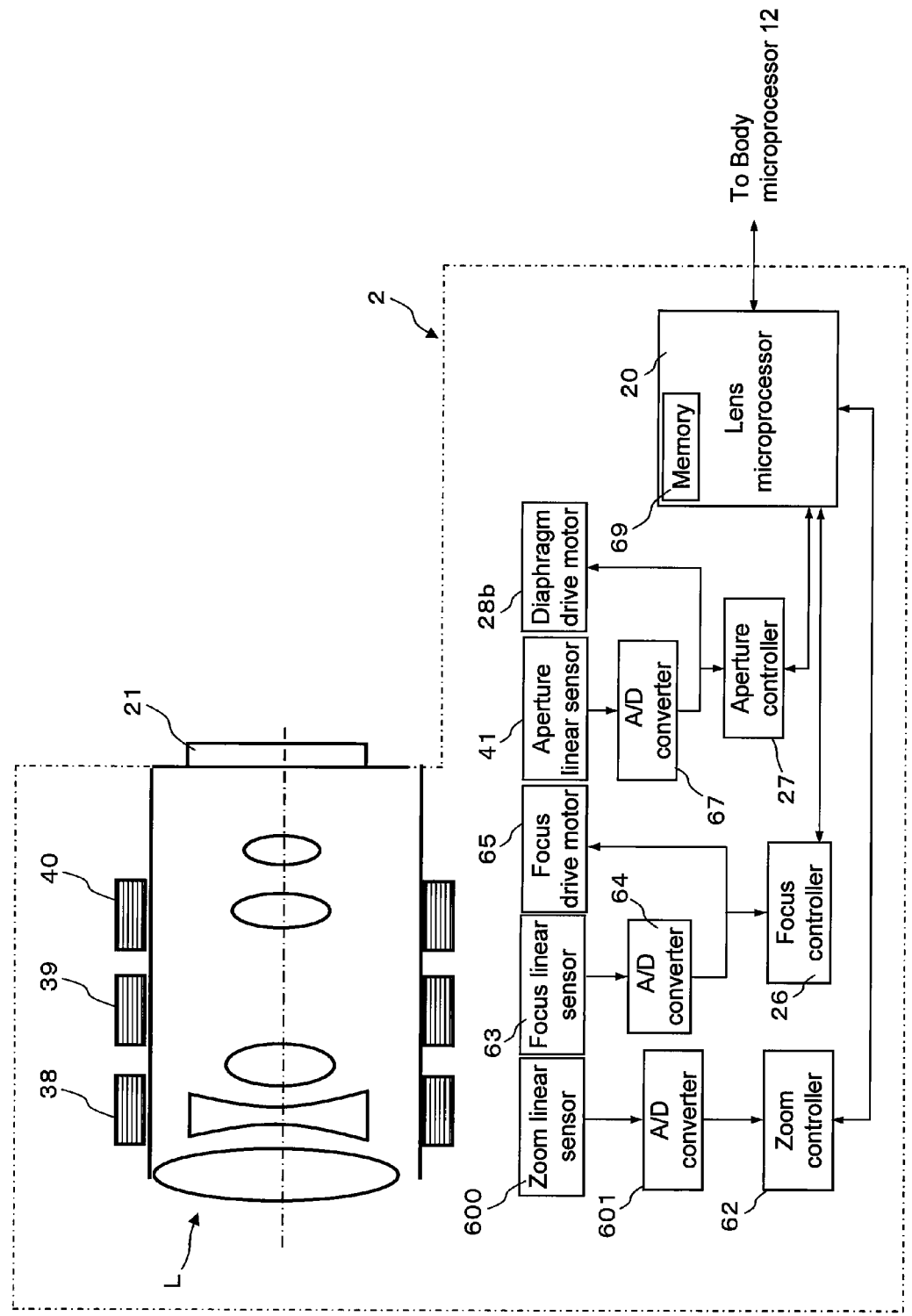
FIG. 11 is a block diagram of the control system inside the interchangeable lens unit pertaining to the first embodiment of the present invention.

FIG. 11 is a block diagram of the control system inside the interchangeable lens unit 2 pertaining to the first embodiment of the present invention.

The lens microprocessor 20 can perform bidirectional communication between the lens microprocessor 20 and a zoom controller 62, bidirectional communication between the lens microprocessor 20 and the focus controller 26, and bidirectional communication between the lens microprocessor 20 and the aperture controller 27.

The zoom controller 62 can receive signals from a zoom linear sensor 600 via an A/D converter 601. The zoom controller 62 converts the amount of rotation of the zoom ring 38 detected by the zoom linear sensor 600 into focal distance information about the imaging optical system L. The zoom controller 62 sends focal distance information to the lens microprocessor 20.

The focus controller 26 can receive signals from a focus linear sensor 63. The focus controller 26 can also send signals to a focus drive motor 65 via an A/D converter 64. The focus controller 26 determines the focus mode from the rotational angle of the focus ring 39, which is detected by the focus linear sensor 63 and digitized by the A/D converter 64. The focus controller 26 sends the result of this determination to the lens microprocessor 20. The focus controller 26 sends focal distance information detected from the rotational angle of the focus ring 39 to the lens microprocessor 20 on the basis of a command from the lens microprocessor 20. The focus controller 26 drives the focus drive motor 65 on the basis of a control signal from the lens microprocessor 20.

The aperture controller 27 can receive signals from the aperture linear sensor 41. The aperture controller 27 can also send signals to the diaphragm drive motor 28b via the A/D converter 67. The aperture controller 27 determines the aperture mode from the rotational angle of the aperture ring 40, which is detected by the aperture linear sensor 41 and digitized by the A/D converter 67. The aperture controller 27 sends the result of this determination to the lens microprocessor 20. The aperture controller 27 sends aperture value information detected from the rotational angle of the aperture ring 40 to the lens microprocessor 20 on the basis of a command from the lens microprocessor 20. The aperture controller 27 drives the diaphragm drive motor 28b on the basis of a control signal from the lens microprocessor 20.

2: Operation of Camera System 2.1: Photographic Operation of Camera System 100 (Viewfinder Photography Mode)

Next, the photographic operation of the camera system 100 will be described. First, the drive sequence in viewfinder photography mode, in which the user looks through the viewfinder eyepiece window 9, will be described through reference to FIGS. 1, 2, 10, and 11.

When the user presses the release button 30 halfway down, power is supplied to the body microprocessor 12 and the various units in the camera system 100. The body microprocessor 12 in the camera system 100, which is activated by the supply of power, receives various kinds of lens data from the lens microprocessor 20 in the interchangeable lens unit 2, which is also activated by the supply of power, via the lens mount 21 and the body mount 23, and stores this data in the built-in memory 68. Then, the body microprocessor 12 acquires the amount of defocus (hereinafter referred to as the Df amount) from the focus detection unit 5, and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases. And at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are reset to their initial positions. The body microprocessor 12 instructs the lens microprocessor 20 to reset the aperture to its open position, and the lens microprocessor 20 issues reset commands to the various units. Upon completion of this resetting, the lens microprocessor 20 notifies the body microprocessor 12 of the completion of resetting. The body microprocessor 12 waits for the completion of a series of processing after exposure and the reset completion information from the lens microprocessor 20, and then confirms that the release button has not been pressed, which concludes the imaging sequence.

2.2: Operation in Monitor Photography Mode

Next, the drive sequence in monitor photography mode, in which the user captures an image using the liquid crystal monitor 16, will be described through reference to FIGS. 1, 3, 10, and 11.

When the liquid crystal monitor 16 is used to capture an image, the user presses the photography mode switching button 75 to set the camera to monitor photography mode. When the camera is set to monitor photography mode, the body microprocessor 12 retracts the quick return mirror 4 from within the optical path X. As a result, light from the subject reaches the imaging sensor 11, so the imaging sensor 11 converts the light from the subject imaged on the imaging sensor 11 into image data, allowing it to be acquired and outputted as image data. The image data read from the imaging sensor 11 by the imaging sensor controller 13 is subjected to specific image processing, after which it is displayed as a photographic image on the liquid crystal monitor 16. Thus displaying the photographic image on the liquid crystal monitor 16 allows the user to follow the subject without looking through the viewfinder eyepiece window 9.

Next, the user presses the release button 30 halfway down, whereupon the body microprocessor 12 receives various kinds of lens data from the lens microprocessor 20 in the interchangeable lens unit 2 via the lens mount 21 and the body mount 23. This lens data is stored in the built-in memory 68. The body microprocessor 12 then uses the quick return mirror controller 60 to return the quick return mirror 4 to a specific position within the optical path X, acquiring the Df amount from the focus detection unit 5, and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases, and at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11. After undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are positioned in a state of being retracted from within the optical path X, so the user can then use the monitor photography mode to view the subject as a photographic image on the liquid crystal monitor 16.

When the monitor photography mode is to be canceled, the user presses the photography mode switching button 75 and changes back to the ordinary photography mode. The ordinary photography mode is the viewfinder photography mode in which the user looks through the viewfinder eyepiece window 9 to capture an image. When the camera is changed back to viewfinder photography mode, the quick return mirror 4 is returned to a specific position within the optical path X. The quick return mirror 4 is also returned to a specific position within the optical path X when the power is shut off to the camera system 100 (such as a single-lens reflex camera) main body.

2.3: Exposure Setting Operation for Camera System

Next, the operation of setting the exposure for the camera system 100 will be described through reference to FIGS. 4 and 10. The camera system 100 has four exposure setting modes: a programmed photography mode in which exposure setting is performed automatically for an ordinary photographic region; a shutter speed preferential photography mode in which the shutter speed is set manually; an aperture preferential photography mode in which the aperture value is set manually; and a manual photography mode in which the shutter speed and aperture value are both set manually.

A user operating the camera system 100 can select among the four exposure setting modes by setting a combination of a specific rotational angle of the aperture ring 40 and the rotational angle of the shutter speed setting dial 31. Specifically, in a state in which the letter "A" on the aperture ring 40 lines up with the pointer 33, the user can set the camera to the programmed photography mode by putting the shutter speed setting dial 31 in the auto position. In a state in which the letter "A" on the aperture ring 40 lines up with the pointer 33, the user can set the camera to the shutter speed preferential photography mode by putting the shutter speed setting dial 31 in the manually settable position. In a state in which any of the numbers "2" to "11" on the aperture ring 40 lines up with the pointer 33, the user can set the camera to the aperture preferential photography mode by putting the shutter speed setting dial 31 in the auto position. In a state in which any of the numbers "2" to "11" on the aperture ring 40 lines up with the pointer 33, the user can set the camera to the manual photography mode by putting the shutter speed setting dial 31 in the manual position.

From here on, of these four exposure setting modes, the programmed photography mode and the shutter speed preferential photography mode will be collectively referred to as the auto aperture mode and the aperture preferential photography mode. The manual photography mode will be referred to as the manual aperture mode.

2.4: Exposure Setting Operation in Auto Aperture Mode

The aperture linear sensor 41 outputs a signal corresponding to rotational angle to the aperture controller 27. When the letter "A" on the aperture ring 40 lines up with the pointer 33 and the user presses the release button 30, the aperture controller 27 determines that the exposure setting mode is the auto aperture mode on the basis of the signal received from the aperture linear sensor 41. The result of this determination is sent to the lens microprocessor 20 and the body microprocessor 12 (sending to the body microprocessor 12 is carried out via microprocessor communication between the lens microprocessor 20 and the body microprocessor 12).

Also, the shutter speed setting dial 31 outputs a signal corresponding to rotational angle to the body microprocessor 12. The body microprocessor 12 recognizes that the exposure setting mode is the auto aperture mode on the basis of the determination result received from the aperture controller 27 and the signal from the shutter speed setting dial 31.

The body microprocessor 12 sends a command to the digital signal processor 53. The digital signal processor 53 sends the body microprocessor 12 an image signal at a specific timing on the basis of the received command. The body microprocessor 12 computes an exposure value on the basis of the received image signal. If the exposure setting mode is the programmed photography mode, the body microprocessor 12 computes a suitable combination from the adjustable aperture value and shutter speed. If the exposure setting mode is the shutter speed preferential photography mode, the body microprocessor 12 computes a suitable aperture value for the set shutter speed.

The body microprocessor 12 produces a control signal on the basis of the computation result. The body microprocessor 12 sends a control signal based on the computed aperture value to the aperture controller 27 via the lens microprocessor 20 on the interchangeable lens unit 2 side. If the exposure setting mode is the programmed photography mode, the body microprocessor 12 sends a control signal based on the computed shutter speed to the shutter controller 14. If the exposure setting mode is the shutter speed preferential photography mode, the body microprocessor 12 sends the shutter controller 14 information about the shutter speed set by the shutter speed setting dial 31.

Also, the body microprocessor 12 sends a control signal to the image display controller 15. The image display controller 15 drives the liquid crystal monitor 16. When the content of the control signal designates the programmed photography mode, the liquid crystal monitor 16 gives a display indicating that the exposure setting mode is the programmed photography mode. When the content of the control signal designates the shutter speed preferential photography mode, the liquid crystal monitor 16 gives a display indicating that the exposure setting mode is the shutter speed preferential photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven.

The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the auto aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the programmed photography mode, the image recorder 18 records an image signal. The image recorder 18 also records information to an internal memory and/or removable memory on the basis of a command from the image recording controller 17 indicating that the exposure setting mode is the programmed photography mode. When the content of the control signal designates the shutter speed preferential photography mode, the image recorder 18 records an image signal and information to an internal memory and/or removable memory on the basis of a command from the image recording controller 17 indicating that the exposure setting mode is the shutter speed preferential photography mode.

2.5: Exposure Setting Operation in Manual Aperture Mode

Next, when the position of any of the numbers "2" to "11" on the aperture ring 40 lines up with the pointer 33 and the user presses the release button 30, the aperture controller 27 determines that the exposure setting mode is the manual aperture mode on the basis of the signal received from the aperture linear sensor 41. The result of this determination is sent to the lens microprocessor 20. Also, the shutter speed setting dial 31 outputs a signal corresponding to rotational angle to the body microprocessor 12.

The body microprocessor 12 recognizes that the exposure setting mode is the manual aperture mode on the basis of the determination result received from the aperture controller 27 and the signal from the shutter speed setting dial 31.

The lens microprocessor 20 requests the aperture controller 27 to provide aperture value information detected from the rotational angle of the aperture ring 40. The aperture controller 27 sends the aperture value information detected from the rotational angle of the aperture ring 40 on the basis of a command from the lens microprocessor 20 to the lens microprocessor 20 and the body microprocessor 12 (sending to the body microprocessor 12 is carried out via microprocessor communication between the lens microprocessor 20 and the body microprocessor 12). If the exposure setting mode is the aperture preferential photography mode, the body microprocessor 12 sends a command to the digital signal processor 53. The digital signal processor 53 sends an image signal to the body microprocessor 12 at a specific timing on the basis of the received command.

If the exposure setting mode is the aperture preferential photography mode, the body microprocessor 12 computes the shutter speed on the basis of the received image signal. If the exposure setting mode is the aperture preferential photography mode, the body microprocessor 12 computes a suitable shutter speed for the detected aperture value. If the exposure setting mode is the aperture preferential photography mode, the body microprocessor 12 produces a control signal on the basis of the computation result. If the exposure setting mode is the aperture preferential photography mode, the body microprocessor 12 sends a control signal based on the computed shutter speed to the shutter controller 14. If the exposure setting mode is the manual photography mode, the body microprocessor 12 sends information about the shutter speed set by the shutter speed setting dial 31 to the shutter controller 14.

Also, the body microprocessor 12 sends a control signal to the image display controller 15. The image display controller 15 drives the liquid crystal monitor 16. When the content of the control signal designates the aperture preferential photography mode, the liquid crystal monitor 16 gives a display indicating that the exposure setting mode is the aperture preferential photography mode. When the content of the control signal designates the manual photography mode, the liquid crystal monitor 16 gives a display indicating that the exposure setting mode is the manual photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven. The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the manual aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the aperture preferential mode, the image recorder 18 records an image signal and information to an internal memory and/or removable memory on the basis of a command from the image recording controller 17 indicating that the exposure setting mode is the aperture preferential mode. When the content of the control signal designates the manual photography mode, the image recorder 18 records an image signal and information to an internal memory and/or removable memory on the basis of a command from the image recording controller 17 indicating that the exposure setting mode is the manual photography mode.

2.6: Operation in Depth of Field Reviewing Mode

Figure 12:
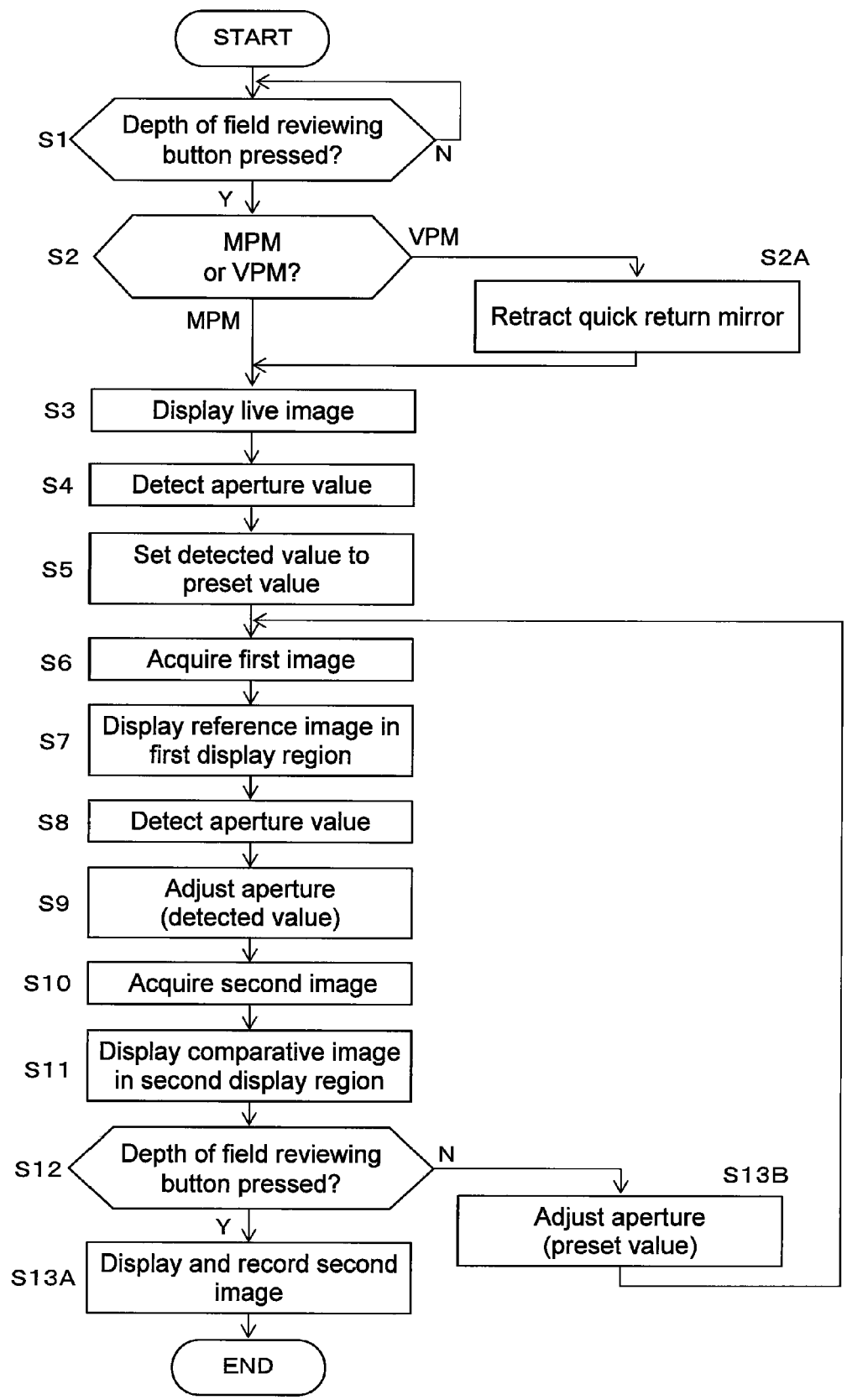
FIG. 12 is a flowchart of a depth of field reviewing mode.
Figure 13:
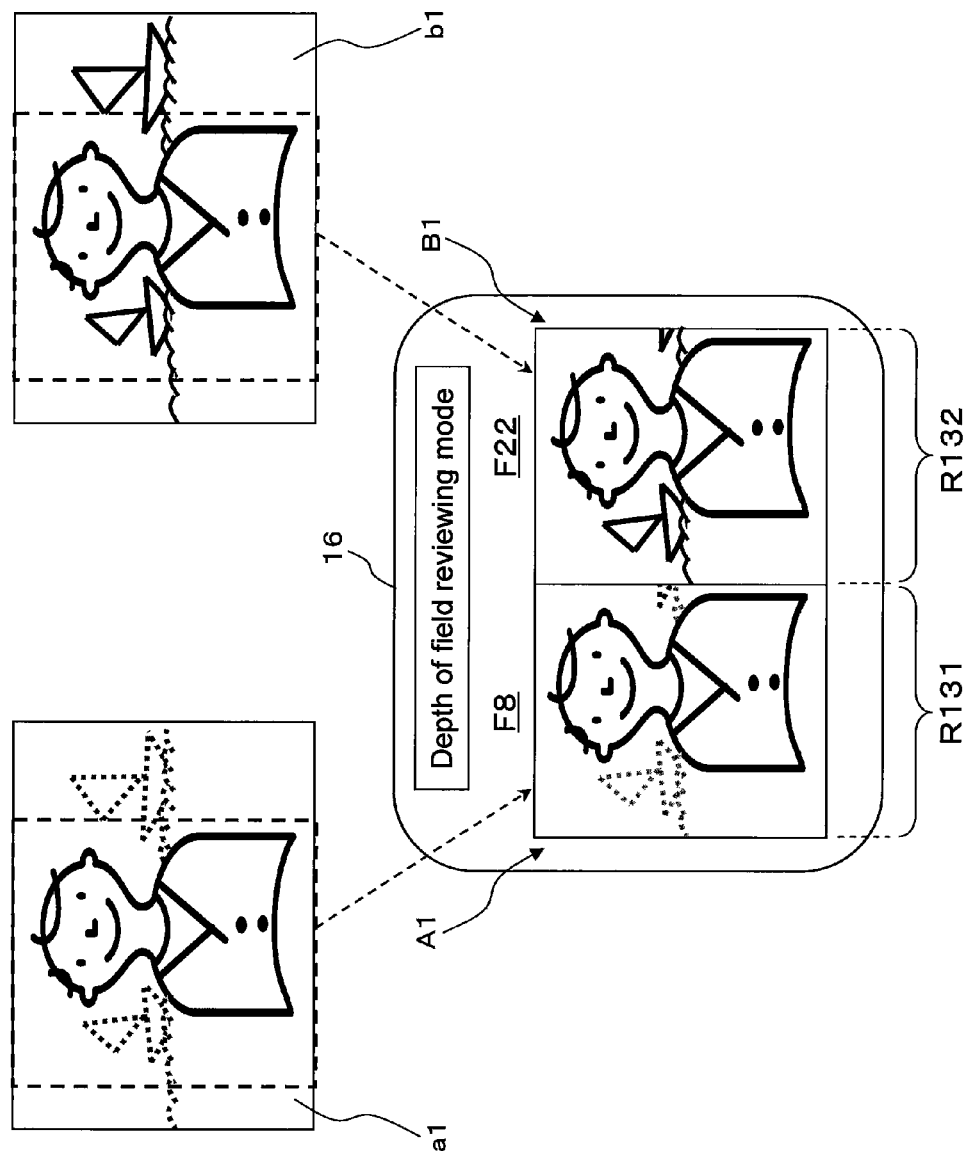
FIG. 13 is an example of the display on a liquid crystal monitor (reference image, comparative image)
Figure 14:
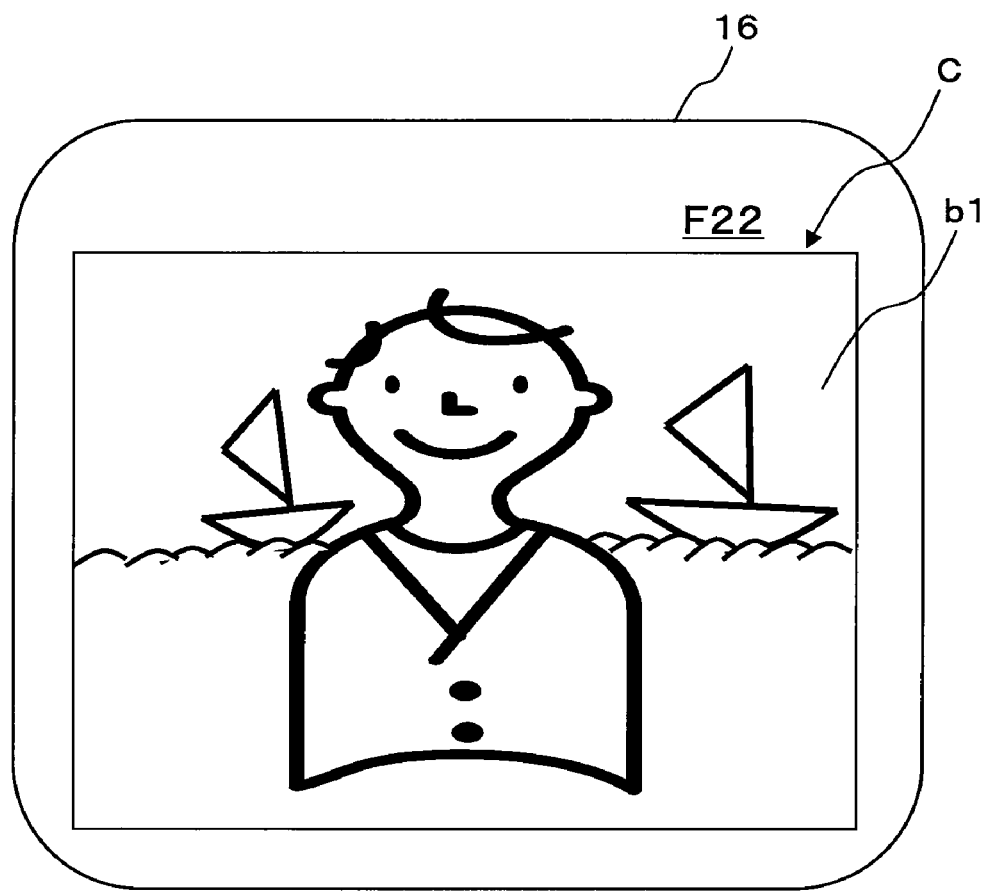
FIG. 14 is an example of the display on the liquid crystal monitor (final image)

With this camera system 100, a depth of field reviewing mode is further provided so that a plurality of images with different aperture values can be compared side by side. The specific operation in depth of field reviewing mode will be described through reference to FIGS. 12 to 14. FIG. 12 is a flowchart of the depth of field reviewing mode. FIGS. 13 and 14 are an example of how images are displayed on the liquid crystal monitor 16 in the depth of field reviewing mode.

In this depth of field reviewing mode, a reference image and a comparative image are displayed side by side on the left and right side of the liquid crystal monitor 16 and are alternately updated by the most recent reference image and comparative image. More specifically, as shown in FIG. 10, the body microprocessor 12 of the camera system 100 determines whether or not the depth of field reviewing button 76 (FIG. 5) has been pressed (step S1). If the depth of field reviewing button 76 has been pressed, the mode changes to depth of field reviewing mode. More specifically, the body microprocessor 12 determines whether the photography mode is the monitor photography mode or the viewfinder photography mode (step S2). If the photography mode is the monitor photography mode, then as shown in FIG. 13, for example, a live image of the subject is displayed on the liquid crystal monitor 16 (step S3). On the other hand, if the photography mode is the viewfinder photography mode, the quick return mirror 4 is retracted from the optical path X (step S2A) and a live image of the subject is displayed on the liquid crystal monitor 16 (step S3). At this point, the aperture controller 27 detects the aperture value, e.g. F8, set by the aperture ring 40 when the mode changes to the depth of field reviewing mode (when the depth of field reviewing button 76 is pressed) (step S4). The detected aperture value is sent as a preset value from the lens microprocessor 20 to the body microprocessor 12, and is stored in the memory 68 of the body microprocessor 12. As a result, the aperture value F8 is set as the preset value (first photography condition) (step S5).

Next, as shown in FIG. 13, a reference image A1 is displayed in a first display region R131 of the liquid crystal monitor 16. More specifically, in a state in which the aperture value is the preset value F8, the imaging component 45 acquires a first image a1 (step S6). The image display controller 15 displays part of the first image a1 as a reference image A1 in the first display region R131 of the liquid crystal monitor 16 (step S7). For example, the range of the reference image A1 in the reference image a1 is preset by the body microprocessor 12, the image display controller 15 or the like. When the reference image A1 is displayed, the preset value "F8" is displayed above the reference image A1. The display state of the reference image A1 is maintained by the image display controller 15 until the acquisition of the next reference image has been completed.

Furthermore, as shown in FIG. 13, a comparative image B1 is displayed in a second display region R132. More specifically, the aperture controller 27 detects the aperture value (second photography condition) set by the aperture ring 40 (step S8). Here, we will assume a case in which the user has moved the aperture ring 40 from F8 to F22 immediately after a change to the depth of field reviewing mode. The aperture controller 27 produces a control signal for driving the diaphragm drive motor 28b on the basis of the detected aperture value F22. The aperture blades are driven by the diaphragm drive motor 28b on the basis of this control signal. As a result, the actual aperture value in the aperture setting component 29 is changed to the aperture value F22 set by the aperture ring 40 (step S9). Upon completion of aperture adjustment, a second image b1 is acquired by the imaging component 45 (step S10). The image display controller 15 displays part of the second image b1 (the portion surrounded by the dashed line in FIG. 13) as the comparative image B in the second display region R132 (step S11). The range of the comparative image B1 in the second image b1, just as with the first image a1, is preset by the body microprocessor 12, the image display controller 15, or the like. When the comparative image B1 is displayed, the detected aperture value "F22" is displayed above the comparative image B1. The display state of the comparative image B1 is maintained by the image display controller 15 until the acquisition of the next comparative image has been completed.

Here, since the comparative image B1 has an aperture value of F22, both the background and the person in the middle are in better focus than in the reference image A1, and the subject field is deep. On the other hand, since the aperture value of the reference image A1 is the preset value F8, the person in the middle is in better focus than in the comparative image B1, but the background is out of focus, and the subject field is shallow.

Next, it is determined whether or not the depth of field reviewing button 76 has been pressed (step S12). More specifically, if the user decides that the comparative image B1 will be the final image C, then the depth of field reviewing button 76 is pressed by the user. As shown in FIG. 14, when the depth of field reviewing button 76 is pressed, the second image b1 is displayed as the final image C on the liquid crystal monitor 16 and is stored by the image recorder 18 (step S13A). Once the final image C has been stored, the depth of field reviewing mode is concluded.

Meanwhile, if the depth of field reviewing button 76 has not been pressed, the diaphragm drive motor 28b is driven by the aperture controller 27 and aperture adjustment is performed so that the aperture value will be the preset value F8 (step S13B). Upon completion of the aperture adjustment, the steps from S6 to S11 in which the first image a1 is acquired are repeated until the depth of field reviewing button 76 is pressed. This allows the two images acquired with different aperture values to be compared side by side and makes it easy to confirm the suitable aperture value and the subject field depth of the image.

Figure 15:
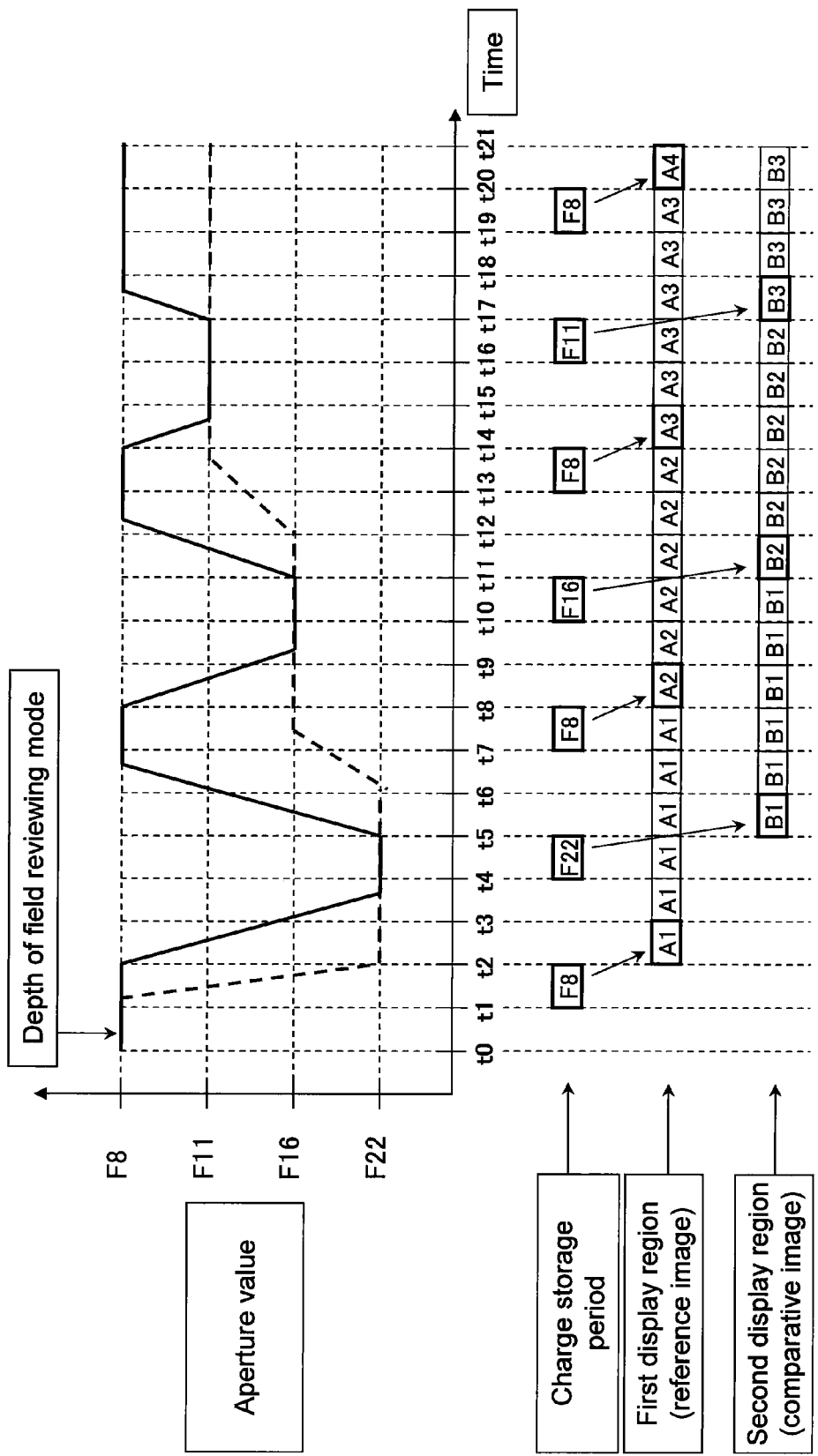
FIG. 15 is a timing chart for the depth of field reviewing mode.

The operation of updating the reference image A and the comparative image B will now be described in detail through reference to FIG. 15. FIG. 15 is a timing chart for the depth of field reviewing mode. The example described here is a case in which the above-mentioned preset value is F8, and the detected aperture value in step S8 is progressively changed to F22, F16, and F11 by user operation of the aperture ring 40. We will assume that the photography mode is the monitor photography mode.

In FIG. 15, the horizontal axis is time, and the vertical axis is the aperture value of the imaging optical system L. The aperture value indicated by the solid line is the one actually set, and the aperture value indicated by the broken line is the indicated value on the aperture ring 40. t0, t1, t2, . . . , t19 on the horizontal axis are timing [points] synchronized to the charge storage operation in the imaging sensor 11. Here, t1-t0=t2-t1= . . . t19-t18=1/30 second. These times are synchronized with the refresh period (single frame period) of the liquid crystal monitor 16. The time intervals surrounded by bold lines and labeled F8, F11, F16, and F22 are charge storage intervals, while the time intervals other than the charge storage intervals are intervals in which the storage of electric charge is halted, or intervals in which the imaging sensor 11 has commenced refresh operation. The length of the charge storage intervals varies with the aperture value, but for the sake of convenience here, we will assume the charge storage intervals all to be of the same length.

The reference image An indicates the type of image displayed in the first display region R131, and the comparative image Bn indicates the type of image displayed in the second display region R132. The images surrounded by bold lines correspond to the immediately prior charge storage interval.

As shown in FIG. 15, the depth of field reviewing button 76 is pressed between times t0 and t1, and the mode changes to the depth of field reviewing mode (step S1). The indicated value F8 on the aperture ring 40 at this point is set as the preset value (step S4). A charge is stored in the imaging sensor 11 from time t1 to t2, the first image a1 is acquired at the aperture value F8, and the reference image A1, which is part of the first image a1, is displayed in the first display region R131 (steps S5 and S6). The reference image A1 continues to be displayed in the first display region R131 until the next reference image A2 is acquired (step S7). Since no comparative image has been acquired at this point, no image is displayed in the second display region R132.

Meanwhile, immediately after the depth of field reviewing button 76 is pressed, the user operates the aperture ring 40 and instantly changes the indicated value on the aperture ring 40 to F22. Therefore, after the reference image A1 is acquired, the indicated value on the aperture ring 40 is detected by the aperture controller 27, and the actual aperture value is adjusted to F22 by the aperture controller 27 (steps S8 and S9). At this point a slight time lag until the actual aperture value is adjusted to the set aperture value occurs and is equal to the time the operation of the diaphragm drive motor 28b takes. Therefore, extra time of roughly 2/30 second is ensured from the time the charge storage is completed for the reference image A1 until the charge storage begins for the comparative image B1. The interval from time t2 to t4 is not outputted from the imaging sensor 11 as an image signal because the stored charge is swept out, etc. A charge is stored in the imaging sensor 11 from time t4 to time t5, a second image b1 is acquired, and the comparative image B1, which is part of the second image b1, is displayed in the second display region R132 (step S10). The display state of the comparative image B1 is maintained until the acquisition of the comparative image B2 has been completed. At this time, the display state of the reference image A1 is maintained in the first display region R131.

Next, after the acquisition of the comparative image B1 is completed, whether or not the depth of field reviewing button 76 has been pressed is confirmed (step S12). If the depth of field reviewing button 76 has not been pressed, the aperture value is adjusted from F22 to the preset value F8 by the aperture setting component 29 in order to acquire the reference image A2 (step S13B). Upon completion of the aperture adjustment, a charge is stored from time t7 to t8, and the acquisition and display of the reference image A2 are performed just as in the case of the reference image A1 (steps S6 and S7). At this point the comparative image B1 continues to be displayed in the second display region R132.

Meanwhile, while the reference image A2 is being acquired, the user operates the aperture ring 40 to change the indicated value from F22 to F16. Therefore, after the acquisition of the reference image A2 is complete, the set aperture value F16 is detected by the aperture controller 27, and the actual aperture value is adjusted to F16 by the aperture setting component 29 from time t8 to t10 (steps S8 and S9). Upon completion of the aperture adjustment, the acquisition and display of the comparative image B2 are performed just as in the case of the comparative image B1 (steps S10 and S11).

Thereafter, as shown in FIG. 15, a reference image A3, comparative image B3, and reference image A4 are acquired successively, and are displayed in the first display region R131 or the second display region R132.

Thus, in this depth of field reviewing mode, the aperture value is adjusted to be the preset value in one period (first period) of 6/30 second, and is adjusted to be indicated value o the aperture ring 40 in one period (second period) of 6/30 second. These periods are offset from one another by 3/60 second, and the aperture values are mutually adjusted on the basis of the preset value and the indicated value. In conjunction with this aperture adjustment operation, a reference image An and a comparative image Bn are mutually acquired in a specific period, and are displayed on the liquid crystal monitor 16.

Thus, with this camera system 100, the reference image An and comparative image Bn are successively updated in the depth of field reviewing mode, so even if the user changes the framing or if the subject moves, it will still be possible to compare the reference image An with the comparative image Bn in substantially the same composition. This improves convenience in side-by-side comparison of images.

Other Embodiments

The specific constitution of the present invention is not limited to the embodiment given above and various modifications and revisions are possible without departing from the gist of the invention.

(1)

In the above embodiment, the update period (first period) of the reference image An was the same as the update period (second period) of the comparative image Bn, but the image update period is not limited to what was given in the above embodiment.

Figure 16:
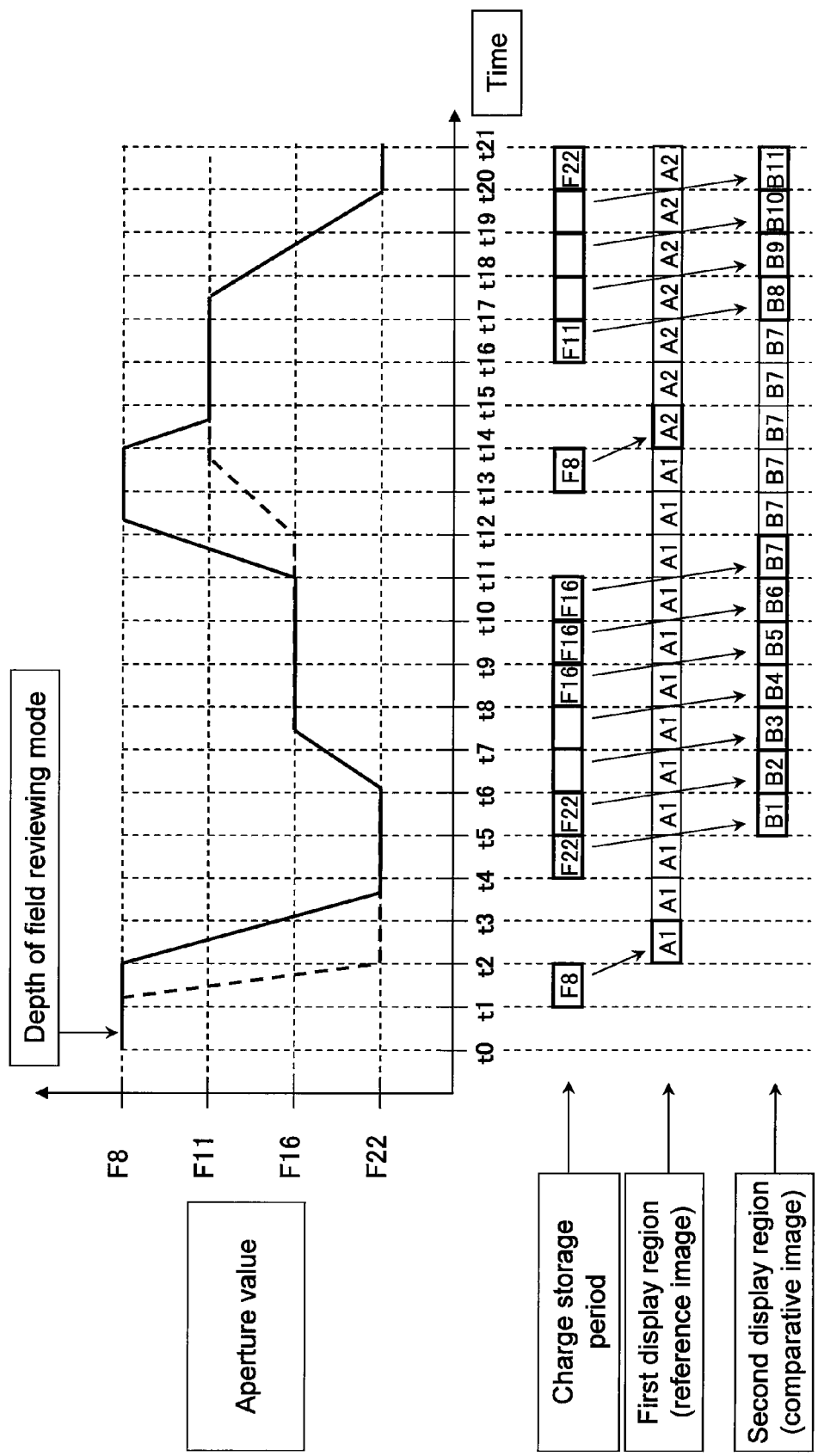
FIG. 16 is a timing chart for the depth of field reviewing mode (other embodiment)

For example, a case in which the reference image An and comparative image Bn are not mutually updated is also conceivable. More specifically, as shown in FIG. 16, the update period of the reference image An is 12/30 second, while the update period of the comparative image Bn is basically 1/30 second. Updating is halted in the period in which the reference image An is acquired and for 5/30 second on either side thereof, and the display state of the newest comparative image (such as comparative image B7) is maintained during the time that the update the comparative image Bn is halted. To put this another way, the update period of the comparative image Bn is a period of 12/30 second, and a continuous imaging operation is repeated for 7/30 second.

Thus setting the update period of the reference image An longer and acquiring the comparative image Bn in a state as close to a live image as possible makes the camera system 100 more convenient to use in such cases as when the comparative image Bn is to be observed preferentially.

Conversely, a case in which the reference image An is acquired in a state as close to a live image as possible is also conceivable. This makes the camera system 100 more convenient to use in such cases as when the reference image An is to be observed preferentially.

Furthermore, in the above embodiment, the unit period (1/30 second) for acquiring an image was synchronized to the update period of the liquid crystal monitor 16 (one frame period). However, the update period is not limited to this. For instance, an image may be acquired in a unit period that includes the aperture drive time in the aperture setting component 29, etc.

Thus, many different patterns are possible for the update periods of the reference image An and comparative image Bn.

(2)

Figure 17:
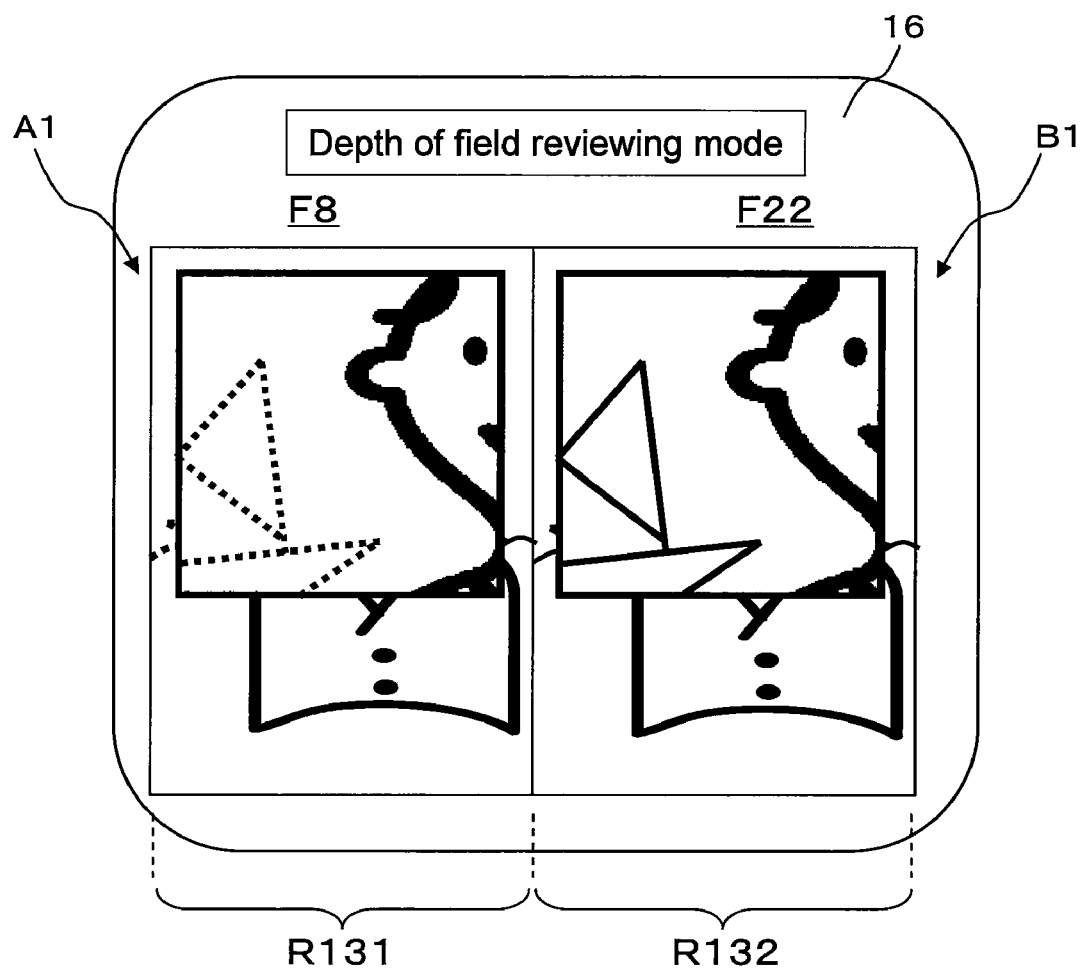
FIG. 17 is an example of the display on the liquid crystal monitor (other embodiment)

The method for displaying the reference image An and comparative image Bn is not limited to what was given in the above embodiment. For instance, as shown in FIG. 17, if part of the reference image An and part of the comparative image Bn are enlarged for display, it will be easier to compare detail portions of the reference image An and the comparative image Bn. This makes it easier for the user to confirm a change in the aperture value. Also, the original image and enlarged image may be updated at the same time, or an enlarged image may be displayed superimposed over the original image.

Figure 18:
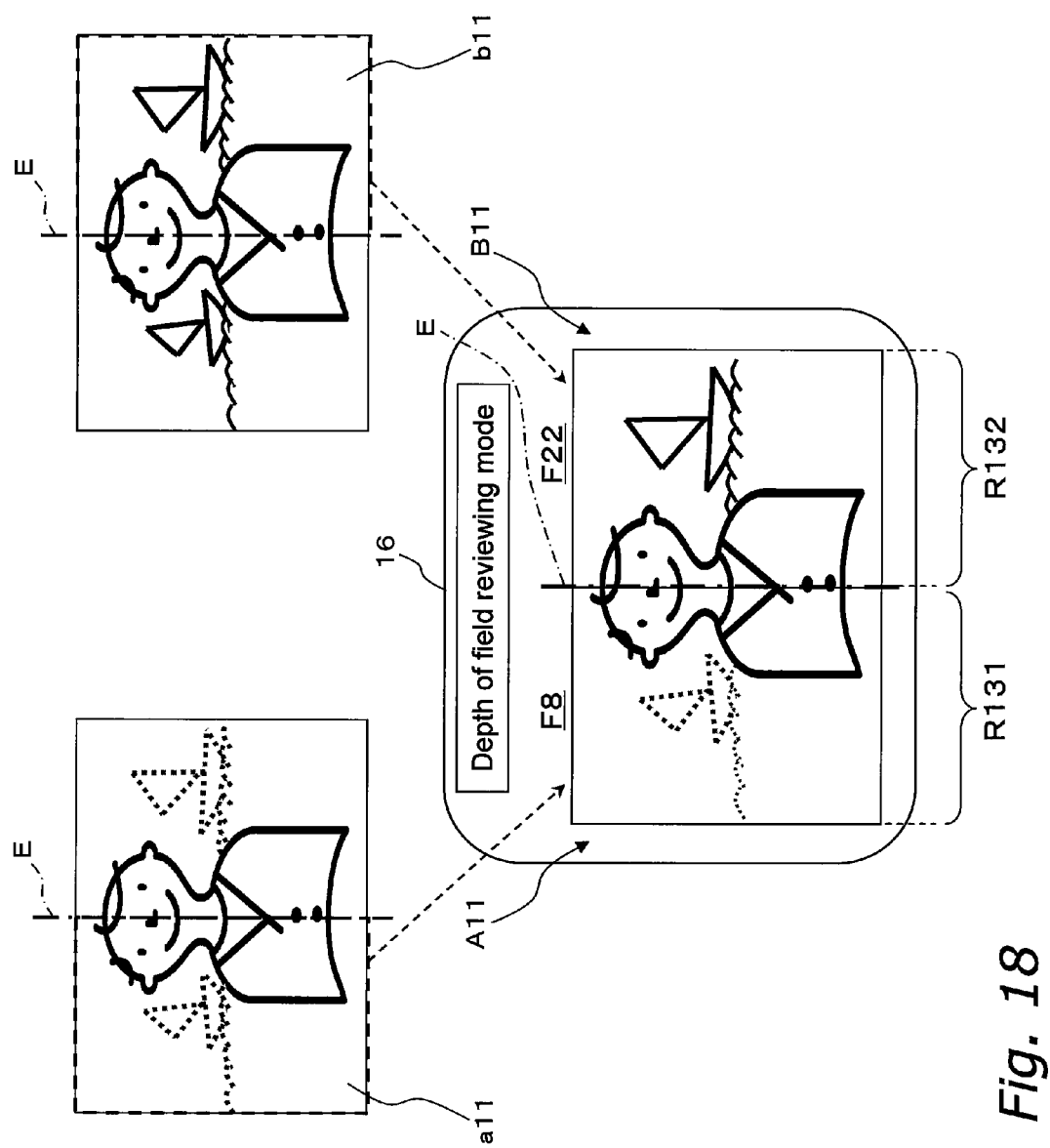
FIG. 18 is an example of the display on the liquid crystal monitor (other embodiment).

Also, in the above embodiment, the positional relationship of the reference image A1 with respect to the first image a1 was the same as the positional relationship of the comparative image B1 with respect to the second image b1. However, as shown in FIG. 18, the reference image A11 may be the left half of the first image a11, and the comparative image B11 may be the right half of the second image b11. Specifically, the reference image An and comparative image Bn are in a relationship of linear symmetry based on the center line E of the image acquired by the imaging component 45. In this case, if the reference image A11 is displayed in the first display region R131 and the comparative image B11 in the second display region R132, as long as the composition of the subject does not change greatly, it will be possible for the reference image A11 and the comparative image B11 to be displayed as a single image. This further increases convenience in comparing images.

(3)

In the above embodiment, the aperture ring 40 mounted on the interchangeable lens unit 2 was used to update the aperture value. However, the configuration may be such that the aperture value is updated using a dial, button, or other such control mounted on the camera main body 1 instead of using the aperture ring 40. Also, the control mounted on the camera main body 1 need not be one intended [solely] for the purpose of updating the aperture value, and may instead be a control that is also used for some other purpose.

(4)

In the above embodiment, the image displayed on the liquid crystal monitor 16 was acquired by the imaging sensor 11, but it is also possible to use another imaging sensor disposed in the viewfinder optical system. In this case, there is no need to retract the quick return mirror 4 from the optical path X in monitor photography mode. Also, the configuration and disposition of the quick return mirror 4, the viewfinder optical system 19, and so forth are not limited to those discussed above.

(5)

In the above embodiment, when the depth of field reviewing button 76 was pressed once, the mode changed to depth of field reviewing mode, and this depth of field reviewing mode was cancelled when the depth of field reviewing button 76 was pressed again. However, the configuration may be such that the depth of field reviewing mode continues only so long as the depth of field reviewing button 76 is being pressed.

(6)

In the above embodiment, the subject field depth was confirmed by changing the aperture value, but the photography condition for this change is not limited to the aperture value. For instance, brightness may be confirmed by changing the aperture value, or when, for example, the shutter speed (charge storage time) varies in conjunction with the aperture value, the image being compared may be a plurality of images captured at different shutter speeds. In this case, the difference of the image blur due to the movement of the object can be confirmed.

Also, it is conceivable that various photography modes, such as scenery photography, nighttime photography, or macro photography, are varied as the photography condition. In this case, the optimal photography mode suited to the photography environment can be confirmed from the reference image An and comparative image Bn.

(7)

In the above embodiment, a single-lens reflex camera was used as an example of the camera system 100, but embodiments of the camera system 100 are not limited to this. For example, this camera system 100 can also be applied to a compact camera or the like.

(8)

The two images displayed side by side on the liquid crystal monitor 16 need not be captured at different aperture values, and may instead have the same aperture value.

(9)

The coordinate axes, directions, and so forth used in the above description do not limit the usage state of the present invention.

General Interpretation of Terms

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A camera system, comprising:
   an imaging optical system configured to form an optical image of a subject;
   an imaging component configured to convert the optical image into an image signal and successively acquiring images of the subject based on a photography condition;
   a display component having first and second display regions that allow a plurality of the images acquired by the imaging component to be displayed side by side;
   a condition adjustment component configured to adjust the photography condition to a first photography condition in a first period; and
   a display control component configured to control the display component to display at least part of a first image acquired by the imaging component under the first photography condition as a reference image in the first display region and to display at least part of a second image acquired by the imaging component at a different timing from that of the first image as a comparative image in the second display region,
   wherein the display control component is arranged to enlarge a part of the reference image in the first display region more than another portion of the reference image, and is arranged to enlarge a part of the comparative image in the second display region more than another portion of the comparative image,
   wherein the positional relationship of the part of the reference image with respect to the first image is the same as the positional relationship of the part of the comparative image with respect to the second image.

2. The camera system according to claim 1, wherein
   the display control component is arranged to continue to display the most recent comparative image on the display component until a newer comparative image is acquired.

3. The camera system according to claim 1, wherein
   the reference image and the comparative image are in a relationship of linear symmetry based on the center lines of the images acquired by the imaging component.

4. The camera system according to claim 1, wherein
   a magnification ratio of the part of the reference image is the same as a magnification ratio of the part of the comparative image.

* * * * *